US012737333B2

United States Patent

(12) United States Patent
Khatibi et al.

(10) Patent No.: US 12,737,333 B2
(45) Date of Patent: Sep. 15, 2026

(54) DATA QUALITY METRIC-BASED RECORD MANIPULATION FOR MASTER DATA MANAGEMENT

(71) Applicant: International Business Machines Corporation, Armonk, NY (US)

(72) Inventors: Mohammad Khatibi, Richmond Hill (CA); Ruolin Wu, Mississauga (CA); Linghao Yu, Richmond Hill (CA); Keqing Wang, Vaughan (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/051,224

(22) Filed: Feb. 12, 2025

(65) Prior Publication Data

US 2026/0236444 A1 Aug. 13, 2026

(51) Int. Cl.
*G06F 16/00* (2019.01)
*G06F 16/215* (2019.01)

(52) U.S. Cl.
CPC .................................. *G06F 16/215* (2019.01)

(58) Field of Classification Search
None
See application file for complete search history.

(56) References Cited

U.S. PATENT DOCUMENTS 11,423,072 B1 * 8/2022 Chen ..................... G06F 18/253
11,481,501 B2 10/2022 Trabelsi et al.
11,941,065 B1 * 3/2024 Li .......................... G06N 20/00
12,050,569 B1 7/2024 Nirantar et al.
2007/0112752 A1 5/2007 Kalthoff et al.
2013/0268494 A1 10/2013 Tahiliani et al.
2017/0372232 A1 12/2017 Maughan et al.
(Continued)

FOREIGN PATENT DOCUMENTS

CN 111427974 A 7/2020
CN 117332247 B 2/2024
CN 117726380 A 3/2024

OTHER PUBLICATIONS

IBM, "IBM InfoSphere Master Data Management", https://www.ibm.com/docs/en/imdm/12.0.0, 08 pages, dated Apr. 8, 2025.
(Continued)

*Primary Examiner* — Bai D Vu
(74) *Attorney, Agent, or Firm* — CHIP LAW GROUP

(57) ABSTRACT

Data quality metric-based record manipulation for master data management includes generating for a pair of data records, attribute pair scores quantifying an extent of match between an attribute of a data record of the pair with a corresponding attribute of another data record in the pair. Data quality metric scores for data quality metrics are computed for each attribute of the pair of data records. A dimension match score is generated that aggregates these scores across multiple data quality metrics. The dimension match score and attribute pair score are combined to create a pair feature vector, which is evaluated against a threshold to determine match outcome information for the pair of data records. Manipulation of the data records is executed in accordance with the match outcome information. The manipulated data is output for further processing, reporting, or analytics.

15 Claims, 12 Drawing Sheets

(56) References Cited

U.S. PATENT DOCUMENTS

| | | | | |
|---|---|---|---|---|
| 2021/0279604 | A1 | 9/2021 | Seth et al. | |
| 2021/0374525 | A1* | 12/2021 | Bremer .................. | G06N 3/045 |
| 2022/0101182 | A1 | 3/2022 | Patel et al. | |
| 2022/0164698 | A1 | 5/2022 | Chaudhary et al. | |
| 2024/0303533 | A1* | 9/2024 | Seth ....................... | G06N 20/00 |

OTHER PUBLICATIONS

IBM, "IBM Knowledge Catalog on Cloud Pak for Data as a Service", https://dataplatform.cloud.ibm.com/docs/content/svc-welcome/wkc.html?context=cpdaas, Feb. 21, 2025, 1 page.

IBM, "IBM Match 360 on Cloud Pak for Data as a Service", https://dataplatform.cloud.ibm.com/docs/content/svc-welcome/mdm.html?context=cpdaas, Mar. 24, 2025, 1 page.

IBM, mpi_srcxsrc, https://www.ibm.com/docs/en/imdm/12.0.0?topic=tables-mpi-srcxsrc, Oct. 21, 2022, 2 pages.

IBM, "Setting clerical review and autolink thresholds", https://www.ibm.com/docs/en/imdm/11.6.0?topic=algorithms-setting-clerical-review-autolink-thresholds, Apr. 26, 2022, 2 pages.

* cited by examiner

| Attribute 602 | Record A 604 | Record B 606 | Attribute Pair Score 608 |
|---|---|---|---|
| Name (10) | Thomas Jones | Thomas Jones Br | 9 |
| Phone Number (20) | 129-532-871 | 984-532-871 | 15 |
| Email (10) | tjones@gail.com | thomasbr@gamil.com | 5 |
| Address (50) | 100 Main St. , Toronto | 1 Main St. , Toronto | 40 |

622

| Data Metrics 610 | Record A 604 | Record B 606 | Total Score 612 |
|---|---|---|---|
| Verifiability | 0.99 | 0.8 | 0.7425 |
| Completeness | 0.75 | 0.7 | 0.56 |

624

Pair Feature Vector : {9, 12, 5, 40, 0.7425, 0.56} 614

Machine Learning Model(s) 616

Classification : Match 618

DATA QUALITY METRIC-BASED RECORD MANIPULATION FOR MASTER DATA MANAGEMENT

BACKGROUND

The disclosure relates to data quality management and more particularly, to metric-based record manipulation for master data management.

In enterprise environments, master data management (MDM) solutions are used to centralize, standardize, and synchronize critical data about key business entities such as customers, products, suppliers, and employees across multiple systems. Managing various versions of data provided from various sources is technically essential because several critical decisions at an enterprise level rely on the quality of the data stored by the enterprises. As organizations handle increasing volumes of data sourced from multiple systems, maintaining data quality has become a significant challenge. However, managing data from disparate sources poses several challenges. Variations in data quality, inconsistency in formats, and duplication often result in inefficiencies. Furthermore, the rapid growth in data volume has amplified concerns about storage and resource utilization.

SUMMARY

In various embodiments of the disclosure, a computer-implemented method for data quality metric-based manipulation of data records is described. The computer-implemented method includes obtaining, by a computer, a pair of input data records. Each data record of the pair includes at least one corresponding attribute. The computer-implemented method further includes applying, by the computer, a machine learning (ML) model on the pair of input data records. The ML model is trained to match the pair at the attribute level based on a pair feature vector that defines at least one attribute pair score for the pair of input data records. The at least one attribute pair score quantifies an extent of match between the at least one corresponding attribute of a first data record in the pair of input data records and the at least one corresponding attribute of a second data record in the pair of input data records. The computer-implemented method further includes generating, by the computer, match outcome information for the pair of input data records, based on the application of the ML model on the pair of input data records. The match outcome information indicates an extent of match between the pair of input data records. The computer-implemented method further includes manipulating, by the computer, at least one data record of the pair of input data records based on the generated match outcome information. The computer-implemented method further includes outputting, by the computer, the manipulated at least one data record.

In various embodiments of the disclosure, a computer system for manipulation of data records for master data management is disclosed. The system includes a processor set, one or more computer-readable storage media, and program instructions stored on the one or more computer-readable storage media. The program instructions are executable by the processor set to cause the processor set to obtain a pair of input data records. Each data record of the pair of input data records includes at least one corresponding attribute. The program instructions are executable by the processor set to further cause the processor set to apply a machine learning (ML) model on the pair of input data records. The ML model is trained to match the pair of input data records at the attribute level based on a pair feature vector that defines at least one attribute pair score for the pair of input data records. The at least one attribute pair score quantifies an extent of match between the at least one corresponding attribute of a first data record in the pair of input data records and the at least one corresponding attribute of a second data record in the pair of input data records. The program instructions are executable by the processor set to further cause the processor set to generate match outcome information for the pair of input data records based on the application of the ML model on the pair of input data records. The match outcome information includes data quantifying an extent of similarity between the pair of input data records. The match outcome information indicates an extent of match between the pair of input data records. The program instructions are executable by the processor set to further cause the processor set to manipulate at least one data record of the pair of input data records, based on the generated match outcome information. The program instructions are executable by the processor set to further cause the processor set to output the manipulated at least one data record.

In various embodiments of the disclosure, a computer program product for data record manipulation for master data management is described. The computer program product includes one or more computer-readable storage media and program instructions stored on the one or more computer-readable storage media to perform operations including obtaining a pair of input data records, each data record of the pair input data records including at least one corresponding attribute. The operations further include applying a machine learning (ML) model on the pair of input data records. The ML model is trained to match the pair of input data records at attribute level based on a pair feature vector that defines at least one attribute pair score for the pair of input data records. The at least one attribute pair score quantifies an extent of match between the at least one corresponding attribute of a first data record in the pair of input data records and the at least one corresponding attribute of a second data record in the pair of input data records. The operations further include generating match outcome information for the pair of input data records based on the application of the ML model on the pair of input data records. The match outcome information indicates an extent of match between the pair of input data records. The operations further include manipulating at least one data record of the pair of input data records based on the generated match outcome information. Furthermore, the operations include outputting the manipulated at least one data record.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures where:

FIG. 6 is a diagram that illustrates an exemplary workflow to generate a pair feature vector in order to evaluate data records using machine learning, in accordance with an embodiment of the disclosure;

DETAILED DESCRIPTION

Figure 1A:
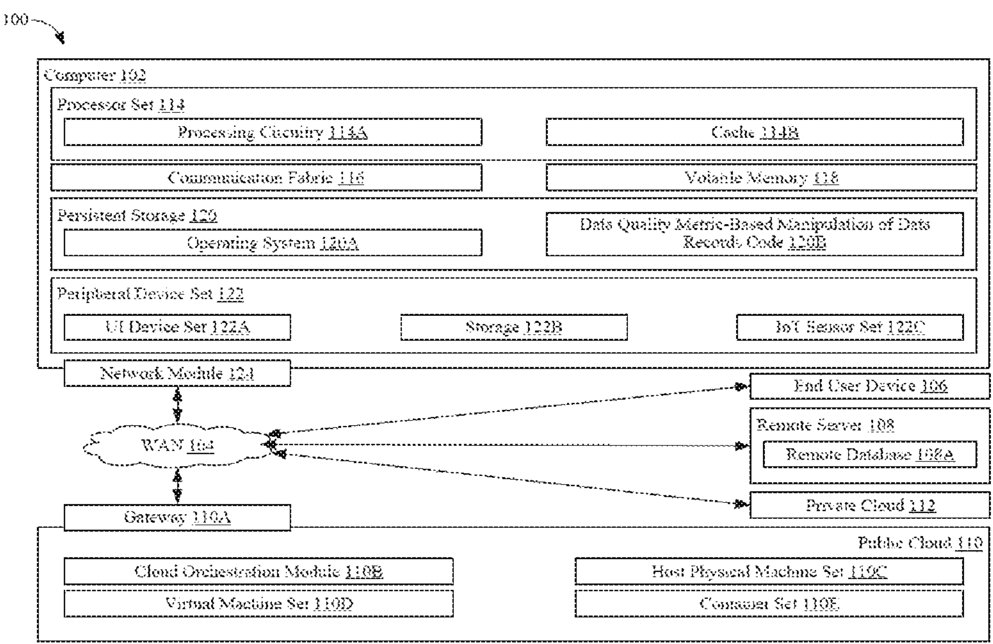
FIG. 1A is a diagram that illustrates a computing environment for data quality metric-based manipulation of data records for master data management, in accordance with an embodiment of the disclosure.

Master data management (MDM) is a process that involves creating and maintaining a single, trusted version of an entity's key data. This data is known as the "master record" or "single source of truth". MDM helps ensure that the data is accurate and consistent across all parts of an organization or entity, including operations, processes, and reporting. Furthermore, MDM ensures that the organization's critical data is consistent and accurate across all systems, reducing discrepancies and errors caused by multiple, siloed copies of the same data. By providing a single version of the truth, MDM helps in making informed and data-driven decisions, improving overall performance. With consistent and accurate data, operational processes such as reporting, inventory management, and customer service become more efficient. MDM helps organizations comply with industry standards and regulations by ensuring that master data is accurately recorded, maintained, and audited. The use of low-quality data can result in incorrect MDM decisions. This may lead to a requirement for a high volume of manual data stewardship and remediation. Furthermore, the onboarding of new sources of data with low quality can lead to another requirement for tuning/re-tuning the matching algorithm which is a time-consuming and resource-intensive process.

Due to segmentation and operational isolation, various sub-units of an organization may maintain separate databases for recording data. This may lead to redundancy and incoherency in the data since each sub-unit may have its syntax and format for data storage. For computer systems, if two data records are incoherent, they may be treated as different even though they may be related in one or many ways. Quite often, this has severe implications for downstream applications that operate on the data records. Record linkage is desired to mitigate such issues, however that is not a scalable and feasible approach when the volume of data records is large.

Data reconciliation is another approach followed when merging two MDM databases. However, such reconciliation has an adverse impact on existing applications that rely on the records of each database because the reconciled records may not be in the same format as the original data record. Also, this requires the need for the retuning of downstream applications and programs to align with the reconciled data records.

In modern data management systems, identifying and handling duplicate records is a significant challenge. These duplicates are caused by variations in data entry such as typos, inconsistent formatting, or missing information, which may lead to inefficiencies, inaccuracies, and redundancy. Managing and linking data across records becomes difficult, leading to inefficiencies, compromised data quality, and redundancy in data systems. In MDM systems, the use of data with low or medium-quality data may lead to incorrect or incomplete record matching, resulting in adverse decisions based on inaccurate information. These challenges are particularly prevalent when integrating new data sources, which often require constant adjustment and re-tuning of matching algorithms to account for variations in data quality. This process is typically time-consuming, error-prone, and may undo previously successful data resolutions, creating inefficiencies in data management workflows. Additionally, the manual effort required to resolve these data quality issues is substantial, leading to high volumes of data stewardship and remediation work.

Probabilistic matching is a complex statistical process that has provided some accuracy. However, solutions based on this approach face significant challenges in accurately matching and linking records, especially when working with low or inconsistent-quality data. These systems often require expert users or consultants to configure hundreds of algorithm parameters, relying heavily on extensive statistical analysis to create custom-weighted scoring mechanisms tailored to the unique characteristics of each dataset. Moreover, measuring customer linking pattern preferences is often a manual and iterative process. Experts frequently need to adjust configurations based on sample reviews, repeating this cycle until the desired linking patterns are achieved. For complex comparisons, such as multi-dimensional checks across attributes like address and phone number, the tuning process becomes even more time-consuming. These labor-intensive processes drive up operational costs, increase delays, and introduce errors, impacting data matching accuracy and resulting in costly business decisions.

To address these issues, there is a need for a system configured to efficiently match and link data records, even when data quality is low or inconsistent. Such a system reduces the manual effort required for data remediation and eliminates the need for an iterative, expert-dependent process of tuning complex matching algorithms. The disclosed system leverages machine learning models, data quality metrics, and dynamic thresholds to assess the similarity between data records, automatically determining whether records are to be linked or treated as non-matches. Additionally, such an approach provides capabilities for record manipulation, such as deleting duplicates or updating inaccurate information, ensuring that the resulting data is clean, accurate, and useful for downstream applications.

The disclosed system addresses the challenges of record matching for MDM by providing an integrated, automated platform designed to handle low or inconsistent data quality. The disclosed system utilizes machine learning models to assess and match data records based on a pair feature vector and data quality metrics, reducing the need for manual intervention and eliminating the complexity of algorithm tuning. The disclosed system operates continuously, analyzing incoming data sources and adjusting matching criteria in real-time to ensure records are updated correctly. The disclosed system relieves storage systems of redundant data records thereby freeing up memory and reducing the requirements to maintain several repositories for similar and/or related data records. The disclosed system and method also assimilate new data records smoothly and efficiently with existing data records by ascertaining whether the new data record has a linkage or similarity to one or more existing data records. This in turn reduces the processing requirements for indexing the data records thereby leading to reduced turnaround times for downstream applications and machines that utilize such data records. By incorporating data quality metrics of different types, the disclosed system adds the ability to tune the desired level of match between data records.

The core components of the disclosed system use machine learning algorithms to generate attribute pair scores and dimension match scores. These scores are combined into a pair feature vector that evaluates the likelihood of a match between records. The disclosed system analyzes data metrics such as completeness, consistency, and verifiability, comparing the generated pair feature vector with a dynamic or pre-defined threshold. If the score meets the threshold, records may be automatically linked. If the score falls below the threshold, the records may be flagged for further review or excluded. Additionally, the system manipulates matched records through exemplary operations including deleting duplicates or updating inaccurate information, ensuring data consistency, and minimizing the need for manual data stewardship.

This disclosed approach improves the efficiency of data matching by automating the process and reducing the need for expert configuration. The disclosed system eliminates manual intervention while minimizing the resources required for data remediation. Such an approach also supports scalability, allowing organizations to manage large volumes of data while maintaining data integrity. Through real-time monitoring and dynamic threshold adjustments, the system ensures accurate matching of records, enabling businesses to make informed decisions based on reliable, up-to-date information.

In various embodiments of the disclosure, a computer-implemented method for data quality metric-based manipulation of data records is described. The computer-implemented method includes obtaining, by a computer, a pair of input data records. Each data record of the pair includes at least one corresponding attribute. The computer-implemented method further includes applying, by the computer, a machine learning (ML) model on the pair of input data records. The ML model is trained to match the pair at the attribute level based on a pair feature vector that defines at least one attribute pair score for the pair of input data records. The at least one attribute pair score quantifies an extent of match between the at least one corresponding attribute of a first data record in the pair of input data records and the at least one corresponding attribute of a second data record in the pair of input data records. The computer-implemented method further includes generating, by the computer, match outcome information for the pair of input data records, based on the application of the ML model on the pair of input data records. The match outcome information indicates an extent of match between the pair of input data records. The computer-implemented method further includes manipulating, by the computer, at least one data record of the pair of input data records based on the generated match outcome information. The computer-implemented method further includes outputting, by the computer, the manipulated at least one data record.

In various embodiments of the disclosure, the computer-implemented method further includes computing, by the computer, the at least one attribute pair score corresponding to each attribute of the at least one corresponding attribute of each data record of the pair of input data records.

In various embodiments of the disclosure, the computer-implemented method further includes computing, by the computer, at least one data quality score for each data record of the pair of input data records. The at least one data quality score corresponds to at least one data quality metric.

In various embodiments of the disclosure, the at least one corresponding attribute of each data record of the pair of input data records includes at least one data field. Each data quality metric of the at least one data quality metric is defined for a respective data field of the at least one data field of each attribute of the at least one corresponding attribute.

In various embodiments of the disclosure, the at least one data quality metric is defined for each attribute of the at least one corresponding attribute of each data record of the pair of input data records.

In various embodiments of the disclosure, the pair of input data records includes a first data record and a second data record. The computer-implemented method further includes computing, by the computer, a first data metric score for the first data record and a second data metric score for the second data record. Each of the first data metric score and the second data metric score corresponds to a data quality metric. The computer-implemented method further includes computing, by the computer, a dimension match score for the pair of input data records, based on the first data metric score and the second data metric score. The dimension match score corresponds to the data quality metric.

In various embodiments of the disclosure, the pair feature vector further includes at least one dimension match score for the pair of input data records. Each dimension match score of the at least one dimension match score corresponds to a different data quality metric.

In various embodiments of the disclosure, the computer-implemented method further includes generating, by the computer, the pair feature vector for the pair of input data records based on the at least one attribute pair score and the at least one dimension match score.

In various embodiments of the disclosure, the pair of input data records includes a first data record and a second data record. The manipulating the at least one data record of the pair of input data records further includes linking the first data record with the second data record.

In various embodiments of the disclosure, the manipulating the least one data record of the pair of input data records further includes deleting the at least one data record of the pair of input data records from a data storage device.

In various embodiments of the disclosure, a computer system for manipulation of data records for master data management is disclosed. The computer system includes a processor set, one or more computer-readable storage media, and program instructions stored on the one or more computer-readable storage media. The program instructions are executable by the processor set to cause the processor set to obtain a pair of input data records. Each data record of the pair of input data records includes at least one corresponding attribute. The program instructions are executable by the processor set to further cause the processor set to apply a machine learning (ML) model on the pair of input data records. The ML model is trained to match the pair of input data records at the attribute level based on a pair feature vector that defines at least one attribute pair score for the pair of input data records. The at least one attribute pair score quantifies an extent of match between the at least one corresponding attribute of a first data record in the pair of input data records and the at least one corresponding attribute of a second data record in the pair of input data records. The program instructions are executable by the processor set to further cause the processor set to generate match outcome information for the pair of input data records based on the application of the ML model on the pair of input data records. The match outcome information includes data quantifying an extent of similarity between the pair of input data records. The match outcome information indicates an extent of match between the pair of input data records. The program instructions are executable by the processor set to further cause the processor set to manipulate at least one data record of the pair of input data records, based on the generated match outcome information. The program instructions are executable by the processor set to further cause the processor set to output the manipulated at least one data record.

In various embodiments of the disclosure, the program instructions further cause the processor set to compute the at least one attribute pair score corresponding to each attribute of the at least one corresponding attribute of each data record of the pair of input data records.

In various embodiments of the disclosure, the program instructions further cause the processor set to compute at least one data quality score for each data record of the pair of input data records. The at least one data quality score corresponds to at least one data quality metric.

In various embodiments of the disclosure, the at least one corresponding attribute of each data record of the pair of input data records includes at least one data field. Each data quality metric of the at least one data quality metric is defined for a respective data field of the at least one data field of each attribute of the at least one corresponding attribute.

In various embodiments of the disclosure, the at least one data quality metric is defined for each attribute of the at least one corresponding attribute of each data record of the pair of input data records.

In various embodiments of the disclosure, the pair of input data records includes a first data record and a second data record. The program instructions further cause the processor set to compute a first data metric score for the first data record and a second data metric score for the second data record. Each of the first data metric score and the second data metric score corresponds to a data quality metric. The program instructions further cause the processor set to compute a dimension match score for the pair of input data records, based on the first data metric score and the second data metric score. The dimension match score corresponds to the data quality metric.

In various embodiments of the disclosure, the pair feature vector further includes at least one dimension match score for the pair of input data records. Each dimension match score of the at least one dimension match score corresponds to a different data quality metric.

In various embodiments of the disclosure, the program instructions further cause the processor set to generate the pair feature vector for the pair of input data records based on the at least one attribute pair score and the at least one dimension match score.

In various embodiments of the disclosure, the pair of input data records includes a first data record and a second data record. To manipulate the at least one data record of the pair of input data records, the program instructions further cause the processor set to link the first data record with the second data record.

According to one or more embodiments of the disclosure, a computer program product for data record manipulation is described. The computer program product includes one or more computer-readable storage media and program instructions stored on the one or more computer-readable storage media to perform operations including obtaining a pair of input data records. Each data record of the pair input data records includes at least one corresponding attribute. The operations further include applying a machine learning (ML) model on the pair of input data records. The ML model is trained to match the pair of input data records at attribute level based on a pair feature vector that defines at least one attribute pair score for the pair of input data records. The at least one attribute pair score quantifies an extent of match between the at least one corresponding attribute of a first data record in the pair of input data records and the at least one corresponding attribute of a second data record in the pair of input data records. The operations further include generating match outcome information for the pair of input data records based on the application of the ML model on the pair of input data records. The match outcome information indicates an extent of match between the pair of input data records. The operations further include manipulating at least one data record of the pair of input data records based on the generated match outcome information. Furthermore, the operations include outputting the manipulated at least one data record.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations may be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that may retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1A is a diagram that illustrates a computing environment for data quality metric-based manipulation of data records for master data management, in accordance with an embodiment of the disclosure. With reference to FIG. 1A, there is shown a computing environment 100 that contains an example of an environment for the execution of at least some of the computer code involved in performing the disclosed methods, such as a data quality metric-based manipulation of data records code 120B. In addition to the data quality metric-based manipulation of data records code 120B, the computing environment 100 includes, for example, a computer 102, a wide area network (WAN) 104, an end user device (EUD) 106, a remote server 108, a public cloud 110, and a private cloud 112. In various embodiments of the disclosure, the computer 102 includes a processor set 114 (including a processing circuitry 114A and a cache 114B), a communication fabric 116, a volatile memory 118, a persistent storage 120 (including an operating system 120A and data quality metric-based manipulation of data records code 120B (as identified above)), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network or querying a database, such as the remote database 108A. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1A. On the other hand, the computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the other storage media discussed below. The program instructions, and associated data, are accessed by the processor set 114 to control and direct the performance of the disclosed methods. In the computing environment 100, at least some of the instructions for performing the disclosed methods may be stored in the dynamic modification of the data quality metric-based manipulation of data records code 120B in the persistent storage 120.

The communication fabric 116 is the signal conduction path that allows the various components of the computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to the computer 102, but alternatively or additionally, the volatile memory 118 may be distributed over multiple packages and/or located externally with respect to the computer 102.

The persistent storage 120 is any form of non-volatile storage for computers that is now known or to be developed in the future. The non-volatility of this storage means that the stored data is maintained regardless of whether power is being supplied to the computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the data quality metric-based manipulation of data records code 120B typically includes at least some of the computer code involved in performing the disclosed methods.

The peripheral device set 122 includes the set of peripheral devices of the computer 102. Data communication connections between the peripheral devices and the other components of the computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In various embodiments of the disclosure, the storage 122B may take the form of a quantum computing storage device for storing data in the form of qubits. In various embodiments of the disclosure where the computer 102 is required to have a large amount of storage (for example, where the computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that may be used in Internet of Things applications. For example, one sensor may be a thermometer and another sensor may be a motion detector.

The network module 124 is the collection of computer software, hardware, and firmware that allows the computer 102 to communicate with other computers through the WAN 104. The network module 124 may include hardware, such as modems or Wi-Fi signal transceivers, software for packetizing and/or de-packetizing data for communication network transmission, and/or web browser software for communicating data over the internet. In various embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods may typically be downloaded to the computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In various embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates the computer 102) and may take any of the forms discussed above in connection with the computer 102. The EUD 106 typically receives helpful and useful data from the operations of the computer 102. For example, in a hypothetical case where the computer 102 is designed to provide a recommendation to an end user, this recommendation may typically be communicated from the network module 124 of the computer 102 through the WAN 104 to the EUD 106. In this way, the EUD 106 may display, or otherwise present recommendations to an end user. In various embodiments of the disclosure, the EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machines that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows the public cloud 110 to communicate through the WAN 104.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system may utilize all resources of that computer, such as connected devices, files and folders, network shares, CPU power, and quantifiable hardware capabilities. However, programs running inside a container may only use the contents of the container and devices assigned to the container, a feature which is known as containerization.

The private cloud 112 may be similar to the public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 1B:
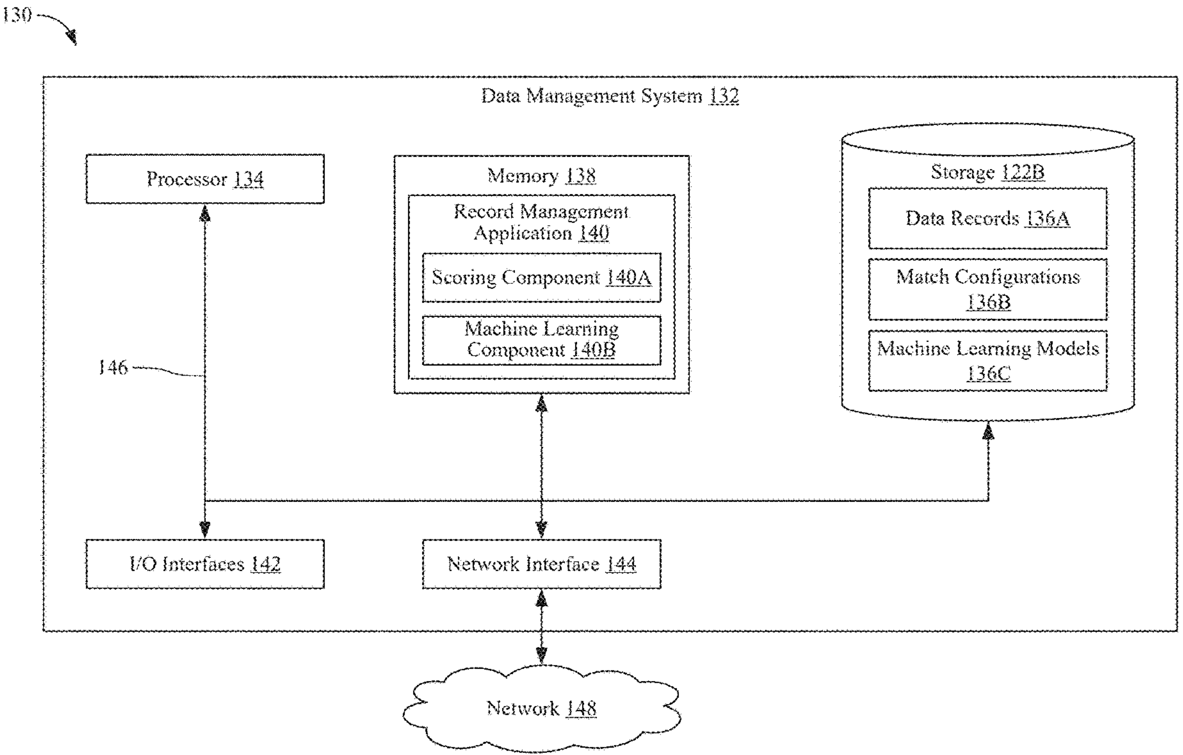
FIG. 1B is a block diagram that illustrates a data management system configured to use machine learning models for data quality metric-based manipulation of data records, in accordance with an embodiment of the disclosure.

FIG. 1B is a block diagram illustrating a data management system 132 utilizing machine learning for data quality metric-based manipulation of data records, in accordance with an embodiment of the disclosure. FIG. 1B is explained in conjunction with elements from FIG. 1A. FIG. 1B illustrates an environment 130 illustrating a setup for the data management system 132 configured to manage and manipulate data records for master data management. In various embodiments, the data management system 132 may be embodied as a standalone or distributed entity in the computing environment 100 of FIG. 1A. Some examples of such a standalone entity include the computer 102, the EUD 106, the remote server 108, the public cloud 110, and the private cloud 112. As a distributed entity, the data management system 132 may be embodied in parts using at least some of the components of the computing environment 100 of FIG. 1A. Irrespective of how it is realized, the data management system 132 operates as a computer system that executes the disclosed methods for the manipulation of data records for master data management. In various embodiments, the data management system 132 may use machine learning techniques to improve data record management and may be implemented either as a physical device or as a virtualized service within a cloud environment, potentially operating across multiple devices for enhanced scalability. The data management system 132 includes a processor 134, the storage 122B a memory 138 that stores a record management application 140, input/output interfaces 142, a network interface 144, and one or more buses 146.

The processor 134 executes programming instructions stored in the memory 138 and manages application data residing in the storage 122B. The processor 134 may include one or multiple processing units allowing the data management system 132 to handle large datasets and complex computations required for record management. The memory 138, typically random-access memory (RAM), provides fast access to data and instructions. The storage 122B, which may include both fixed and removable storage devices, such as disk drives, memory cards, or network-attached storage, houses data records and holds data records and resources needed for record management. In various embodiments, the storage 122B may also store historical data, training datasets, or codes and programs for machine learning models, which may be retrieved and utilized by the data management system 132 to refine the accuracy of data management operations. The network interface 144 communicatively couples the data management system 132 via network 148 with other devices, databases, or services, facilitating the integration of data from various sources. In an embodiment, the network 148 may be an exemplary embodiment of the WAN 104 of FIG. 1A.

The I/O interfaces 142 support communication with external input and output devices such as sensors, databases, or other modules such as keyboards, display devices, speakers, etc. Through the network interface 144, the data management system 132 may communicate with other devices and components, potentially over the network 148, which may include the Internet, local networks, or other network configurations. The network 148 may comprise wired, wireless, or a combination of wired and wireless networks. As shown in FIG. 1B, the processor 134, the memory 138, the storage 122B the network interface 144, and the I/O Interfaces 142 are communicatively linked by the one or more buses 146.

The memory 138 includes the record management application 140 for analyzing records and identifying similarities, associations, relations, connections, or redundancies between the data records 136A, based on data quality metrics. This enables intelligent linking, aggregation, or deletion of at least some data records of the data records 136A stored in the storage 122B. As an example, the record management application 140 may identify a pair of data records of the data records 136A as pertaining to the same entity and link or aggregate them to provide a consolidated repository or delete redundant entries to maintain data integrity. Although shown as software within the memory 138, the record management application 140 may be implemented using hardware, software, or a combination of both.

The record management application 140 includes a scoring component 140A and a machine learning component 140B. These components, while depicted as separate for clarity, may have operations combined or distributed across other system components. The scoring component 140A evaluates pairs of data records of the data records 136A to create a pair feature vector for each pair of data records. The pair feature vector represents a degree or extent of similarity or difference between the records in the pair of data records (also referred to as data record pair or simply record pair) and may be expressed analytically in terms of scores. In various embodiments, the scoring component 140A and the machine learning component 140B may utilize match configurations 136B from the storage 122B to calculate various kinds of scores for each record pair in the data records 136A. The machine learning component 140B may train machine learning models 136C for matching the data records 136A in a supervised manner. The data management system 132 utilizes these trained models 136C to evaluate and compare new or existing data records in the data records 136A. In various embodiments, each data record of the data records 136A may include links or pointers to other related records. For example, each data record of the data records 136A may reference other data records pertaining to the same entity in the data records 136A. In at least one embodiment, aggregate records are created by consolidating data from matching records into a single, comprehensive record for the entity. New records, as they arrive, may be compared with other newly received records and/or with the existing stored data records 136A and accordingly may be linked with other records, discarded, or reconciled with other data records depending on the outcome of the matching process.

The match configurations 136B include weights and parameters guiding a probabilistic matching engine or algorithm. The match configurations 136B may include default or reference parameters for generating various scores, such as attribute scores, data quality metric scores, and dimension match scores which are described in detail later in this disclosure. In various embodiments, the match configurations are adjusted (e.g., using the machine learning models 136C) to improve scoring precision. The machine learning models 136C may be trained on data records such as training data records (e.g., using pair feature vector for record pairs or sets) to enhance record-matching capabilities.

Each data record of the data records 136A may include at least one attribute that defines a characteristic feature of the data of a subject associated with the corresponding data record. As an example, a data record associated with a person may include a name of the person as an attribute, a date of birth as another attribute, and a gender as another attribute. Furthermore, each attribute of a data record may include at least one data field. As an example, the attribute-name of the person may include a first name of the person as a data field, a middle name as another data field, and a last name as another data field. Similarly, the attribute date of birth may include a data field—data, another data field as a month, and still another data field as a year. In various embodiments, an attribute may include a single data field. For example, the attribute-gender may include a single data field for the gender. The machine learning models 136C may be trained to identify similarities (or differences) between data records at an attribute level. In this regard, the machine learning models 136C may be trained to perform such identification with an acceptable error rate.

Figure 1C:
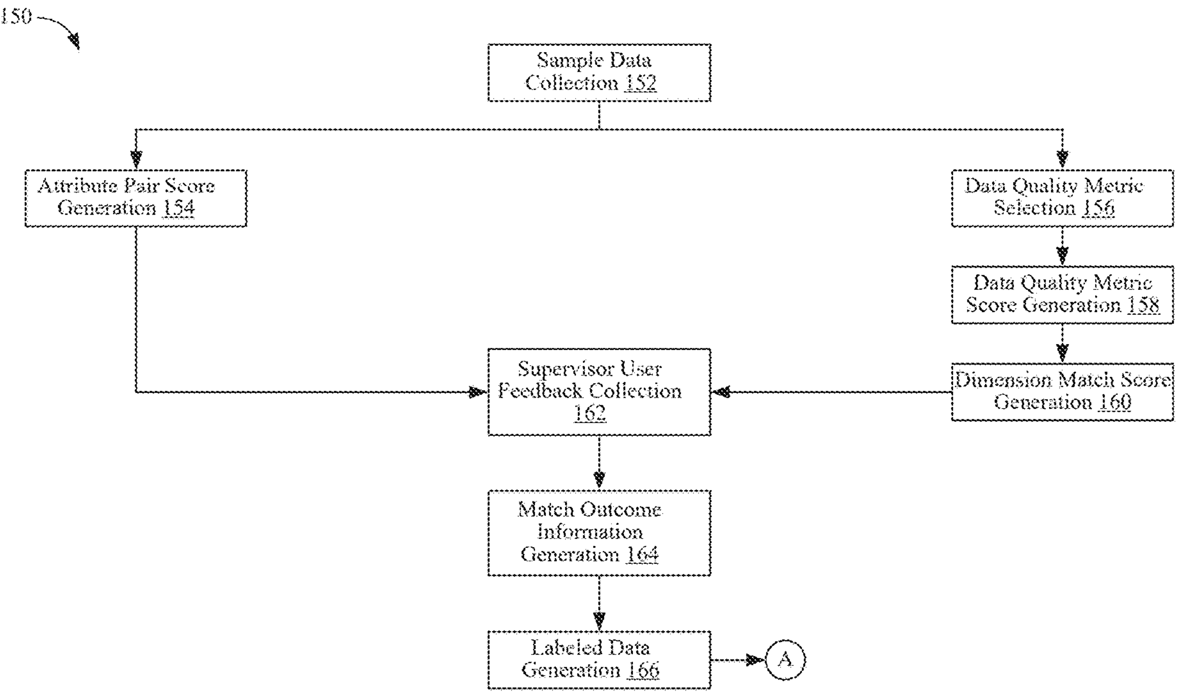
FIGS. 1C and 1D are diagrams that collectively illustrate an exemplary framework for training machine learning models for generating match outcome information for a pair of input data records, in accordance with an embodiment of the disclosure.
Figure 1D:
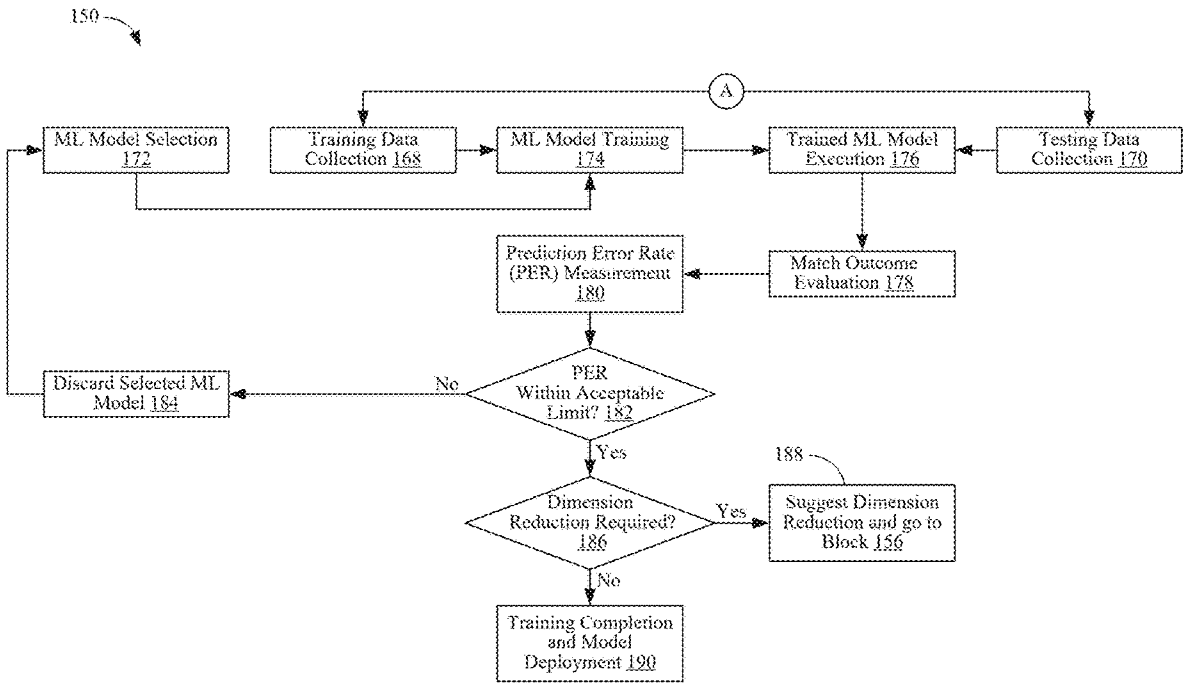

FIGS. 1C and 1D are diagrams that collectively illustrate a training framework 150 for training machine learning models for generating match outcome information for a pair of input data records, in accordance with an embodiment of the disclosure. FIGS. 1C and 1D are explained in conjunction with elements from FIG. 1A and FIG. 1B. With reference to FIGS. 1C and 1D, there is shown a block diagram that illustrates exemplary operations 152-190, as described herein. The exemplary operations illustrated in the block diagram may start at 152 and may be performed by any computing system, apparatus, or device, such as by the computer 102 of FIG. 1A or the data management system 132 of FIG. 1B. Hereinafter, the computing device that performs the exemplary operations of the training framework 150 may be referred to as a trainer computer system. Although illustrated with discrete blocks, the exemplary operations associated with one or more blocks of the block diagram may be divided into additional blocks, combined into fewer blocks, or eliminated, depending on the particular implementation.

Referring to FIG. 1C, at 152, a sample data collection operation may be performed. In the sample data collection operation, the trainer computer collects data records from one or more sources. Since the objective of the training framework 150 is to train the machine learning models 136C, the sample data collection 152 is done such that the sample data includes a mix of data records having linkages to each other as well as some data records having no linkage to each other. In this regard, a part of the sample data may be collected for related entities and another part of the sample data may be collected for unrelated entities. Multiple data record pairs may be defined in the collected sample data and the model may be trained using each data record pair in the collected data records.

At 154, an attribute pair score generation operation is performed. In the attribute pair score generation operation, for each pair of data records in the collected sample data, the trainer computer generates an attribute pair score corresponding to each attribute in the data records. For example, if two data records correspond to customers of a business, the name of the customer in each data record may be considered an attribute. To generate the attribute pair score, any suitable matching approach may be utilized such that the extent of similarity for the attribute in consideration is quantified as a score. For example, a probabilistic comparison of the data in each field of the attribute in a first data record and a second data record may be performed and the degree of match in each field may be consolidated to compute the attribute pair score for the attribute in consideration. Similarly, the attribute pair score may be generated for other attributes present in the data records in a pair of data records. It may be contemplated that the attribute pair score generation 154 may be performed for attributes that are common as well as for attributes that are distinct between the data records in the pair of data records.

At 156, a data quality metric selection operation is performed. Data quality of data records may be expressed in terms of various quality metrics (also referred to as data dimensions or simply dimensions). These metrics may be defined in the context of the information stored in the data records. In an embodiment, the data quality metrics may be predefined by an administrator or by an entity. In an alternate embodiment, the data quality metrics may be dynamically defined in the context of the information stored in the data records under consideration. It may be noted that each data quality metric measures the quality of a data record in some context, irrespective of how these metrics are defined. Some non-limiting examples of data quality metrics may include accuracy, completeness, consistency, relevancy, freshness, validity, uniqueness, verifiability, auditability, and the like.

In the data quality metric selection operation, the trainer computer selects the data quality metrics in terms of which the data quality of the records is to be evaluated. In various embodiments, the trainer computer may receive a selection of such data quality metrics in terms of which the data quality of the records is to be evaluated. The choice of a data quality metric and the number of such data quality metrics taken into consideration govern the matching criteria for the pair of data records. A large number of data quality metrics may yield a lower number of qualifying matches while a low count of the data quality metrics may yield a large number of qualifying matches. Accordingly, through multiple iterations of the training framework 150, the prediction results of the model under training may be analyzed to set the desired data quality metrics. The data quality metric selection operation may be performed in accordance with preferences that may be predefined or provided as input.

At 158, a data quality metric score generation operation is performed. In the data quality metric score generation operation, the trainer computer scores each data record in a pair of data records corresponding to each selected data quality metric. In this regard, a data quality metric may be defined for at least one attribute of a data record. Additionally, or alternately, in various embodiments, a data quality metric may be defined for at least one data field of an attribute of a data record. In order to score the attributes of a data record in terms of a data quality metric, there may be predefined rules that may be utilized for the underlying score computation. For example, a data record pertaining to a customer's name may be provided a score of 10 on 10 for the data quality metric "completeness" if each field of the customer's name has a corresponding entry. Similarly, when only the first name field has an entry, the attribute-"customer's name" may be given a score of 3 out of 10. In this manner, each attribute of each data record in the pair of data records may be scored.

At 160, a dimension match score generation operation is performed. The dimension match score generation operation includes generating by the trainer computer, a consolidated score corresponding to each data quality metric (or dimension) for the pair of data records. For example, corresponding to a data dimension, the individual data quality metric score of each data record in a pair of data records may be obtained and an average of them may be computed as the dimension match score of the pair of data records for the selected data quality metric/dimension. In an embodiment, to compute the dimension match score of the pair of data records corresponding to a dimension, the trainer computer may utilize any suitable data stewardship strategy such as minimized, balanced, average, minimum, or maximum. An example of computing the dimension match score corresponding to the dimension/data quality metric of "Accuracy" for a pair of data records is illustrated below for a few data stewardship strategies:

Minimized Data Stewardship (accounting for the probability of two independent events with varying probabilities):

$$\text{Pair\_Accuracy}_{minimized}(r_1, r_2) = \text{Accuracy }(r_1) * \text{Accuracy }(r_2)$$

Balanced Data Stewardship (accounting for a softer version of Minimized Data Stewardship to avoid excessive false negatives):

$$\text{Pair\_Accuracy}_{balanced}(r_1, r_2) = \sqrt{\text{Accuracy }(r_1) * \text{Accuracy }(r_2)}$$

Average of Data Qualities:

$$\text{Pair\_Accuracy}_{averaged}(r_1, r_2) = \text{Average (Accuracy }(r_1), \text{Accuracy }(r_2))$$

Minimum of Data Qualities:

$$\text{Pair\_Accuracy}_{minimum}(r_1, r_2) = \text{Minimum (Accuracy }(r_1), \text{Accuracy }(r_2))$$

Maximum of Data Qualities:

$$\text{Pair\_Accuracy}_{maximum}(r_1, r_2) = \text{Maximum (Accuracy }(r_1), \text{Accuracy }(r_2)).$$

where:

Accuracy ($r_1$) is the data quality metric score corresponding to the data quality metric "Accuracy" for a first record ($r_1$) in the pair of data records ($r_1$, $r_2$), Accuracy ($r_2$) is the data quality metric score corresponding to the data quality metric "Accuracy" for a second record ($r_2$) in the pair of data records ($r_1$, $r_2$), and Pair_Accuracy ($r_1$, $r_2$) is the dimension match score for the dimension/data quality metric "Accuracy" for the pair of data records ($r_1$, $r_2$).

At 162, a supervisor user feedback collection operation is performed. In the supervisor user feedback collection operation, the trainer computer renders the attribute pair scores and the dimension match scores for each pair of data records to a supervisor user. Here for each pair of the data record, the attribute pair score generated in the attribute pair score generation operation and the dimension match score generated in the dimension match score generation operation are presented to the supervisor user and the supervisor user responds with a label selected from a group consisting of "link", "unlink", and "skip". The selected label is received by the trainer computer as a feedback response from the supervisor user through a suitable interface. In an event, the data records in a pair of data records have a good similarity and the supervisor user discerns that they can be linked, the supervisor user attaches the label-"link" to such a matching pair. For example, if two data records in a candidate pair have a high attribute pair score (greater than or equal to a respective threshold) for at least one common attribute, and the dimension match score is high (greater than or equal to a respective threshold) for most of the dimensions selected at the data quality metric selection operation, such a candidate pair may be labeled with the label "link" by the supervisor user.

However, where the data records in a pair of data records have a low degree of similarity and the supervisor user discerns that they cannot be linked, the supervisor user attaches the label-"unlink" to such a matching pair. In an event, it is discerned that the data records in a pair are unrelated to each other and that such pairs are not comparable, the supervisor user attaches the label-"skip" to such a pair of data records. In each instance of the review in the supervisor user feedback collection operation, at 164, the trainer computer performs a match outcome information generation operation. In the match outcome information generation operation, the trainer computer outputs the labeled data record pair along with the scores associated with it as the match outcome information. At 166, a labeled data generation operation is performed. In the labeled data generation operation the trainer computer stores the match outcome information as labeled data.

The labeled data may be stored in a suitable storage medium such as a training database. Referring to FIG. 1D, at 168, a training data collection operation is performed while at 170, a testing data collection operation is performed. The trainer computer partitions the stored labeled data into training data and testing data. The training data is collected in the training data collection 168 operation while the testing data is collected in the testing data collection 170 operation. The partitioning of the stored labeled data may be performed in any suitable ratio as desired. For example, 80% of the labeled data may be collected as training data while the remaining 20% may be collected as testing data for training of a model.

At 172, a machine learning (ML) model selection operation is performed. In the ML model selection operation, the trainer computer selects a candidate ML model for training. Some non-limiting examples of the ML models include convolutional neural networks. The ML model selection operation may be a random selection or a serial selection. At 174, an ML model training operation is performed. In the ML model training operation, the trainer trains the selected ML model using the training data collected in the training data collection operation. It may be recalled that the collected training data includes labeled data (e.g. data record pairs, their labels, and the various scores associated with them). As such, the selected model is trained to learn the association between data records based on their scores and the labels for the pair. Once the training of the selected ML model is complete, at 176, a trained ML model execution operation is performed. In the trained ML model execution operation, the trainer computer executes the trained model on the collected testing data. The trained model predicts match outcome information. At 178, a match outcome evaluation operation is performed. In the match outcome evaluation operation, for each data record pair in the testing data, the trainer computer evaluates the trained model's predictive performance by comparing the trained model's prediction result for the data record pair with the label associated with that data record pair in the testing data. At 180, a predictive error rate (PER) measurement operation is performed. In the PER measurement operation, the trainer computer measures the predictive error rate of the trained model based on the comparison of the trained model's prediction result for the data record pair with the label associated with that data record pair in the testing data. The PER may be computed based on a distance function that measures the distance between the predicted result and the label for every pair of data record in the testing data.

At 182, the trainer computer performs a check regarding whether the measured PER is within acceptable limit. The acceptable limit may be a configurable threshold value that is defined based on how strongly a match between two data records is desired. Such a limit may be set by the supervisor user during the training of the model. If the check at 182 returns a no (e.g., the PER is not within the acceptable limit), at 184 a discard selected ML model operation is performed in which the selected model is discarded, the trainer computer selects another model at the ML model selection operation 172, and the process is repeated from operations 172-182. However, if the check at 182 returns a yes (e.g. the PER is within the acceptable limit) the control passes to a dimension reduction requirement check operation at 186 to check if dimension reduction is required. It may be noted that in some instances, although the PER may be within the limit, the match outcome predicted by the model may not be a true reflection of the labeled data especially in terms of the scores associated with one or more dimensions. In this regard, the influence of each dimension selected at the data quality metric selection operation on the matching outcome (and thereby the PER) is ascertained and the trainer computer, at 188, performs a suggest dimension reduction operation in which possible removal of one or more dimensions selected at 156 is suggested. For example, the dimensions that may not be critical for judging the data quality for the pair or those dimensions that may not have a contextual relevance with the pair of data records may be possibly removed. The control of operations then passes back to the data quality metric selection operation at 156 where fewer dimensions are selected than the previous iteration and the operations from 156-186 are repeated. However, if at 186, it is ascertained that dimension reduction is not required, at 190, the trainer computer declares the training framework 150 complete and the trained model is output for deployment. In this way, various embodiments provide an adaptive and flexible approach for supervised training of ML models for matching data records at the attribute level in terms of a plurality of dimensions. In an embodiment, the training framework 150 may be executed wholly or in parts using a suitable computing platform such as the processor 134 of FIG. 1B which may invoke the machine learning component 140B of the record management application 140 for training the machine learning models 136C.

Figure 2:
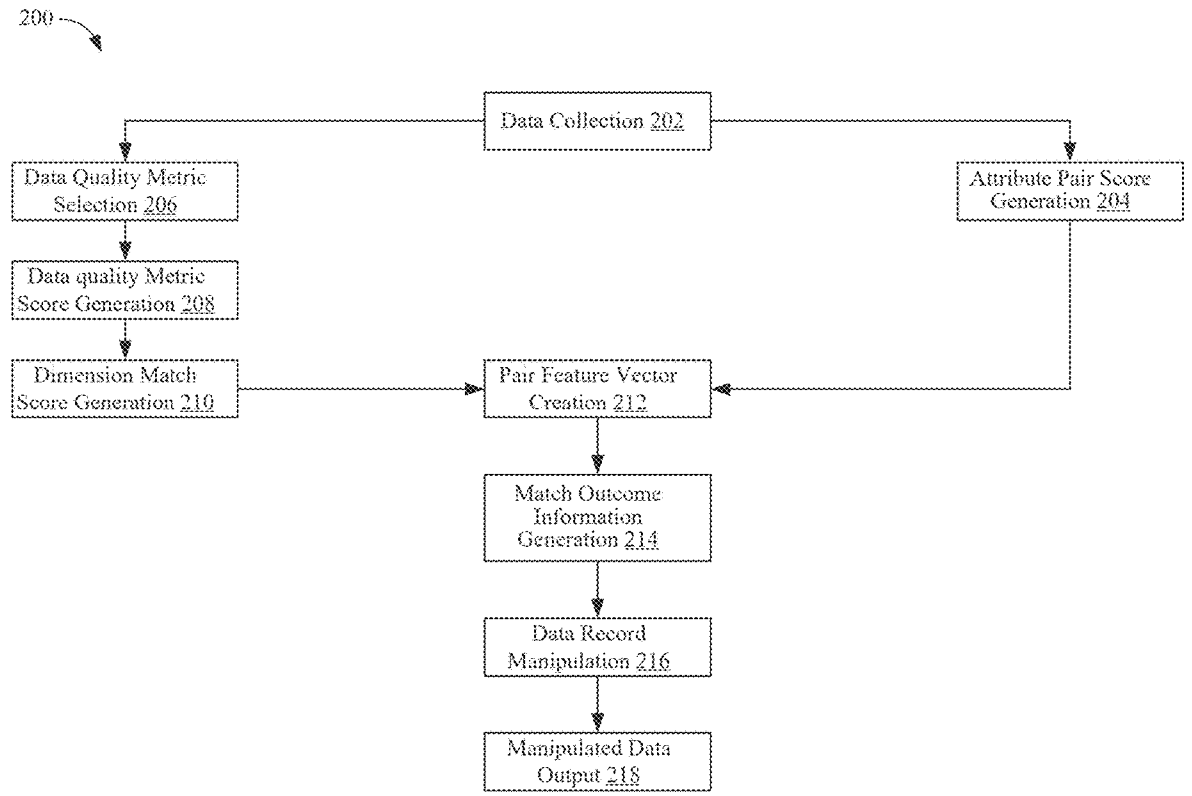
FIG. 2 is a diagram that illustrates a framework for data quality metric-based manipulation of data records for master data management, in accordance with an embodiment of the disclosure.

FIG. 2 is a diagram that illustrates a framework 200 for data quality metric-based manipulation of data records for master data management, in accordance with an embodiment of the disclosure. FIG. 2 is described in conjunction with elements from FIG. 1A, FIG. 1B, FIG. 1C, and FIG. 1D. With reference to FIG. 2, there is shown a block diagram of the framework 200 that illustrates exemplary operations from 202-218, as described herein. The exemplary operations illustrated in the block diagram may start at 202 and may be performed by any computing system, apparatus, or device, such as by the computer 102 of FIG. 1A or the data management system 132 of FIG. 1B. Hereinafter, for the purpose of explanation, the computing device that performs the exemplary operations of the framework 200 may be considered to be the data management system 132 of FIG. 1B. Although illustrated with discrete blocks, the exemplary operations associated with one or more blocks of the block diagram of the framework 200 may be divided into additional blocks, combined into fewer blocks, or eliminated, depending on the particular implementation. Referring to FIG. 2, at 202, a data collection operation is performed for collecting data records for matching and manipulation. The data collection operation may be initiated by the data management system 132, for example when new data records are introduced into the system or as part of an ongoing data processing operation. This initiation may be triggered automatically by incoming data from external sources, such as sensor inputs, database imports, or APIs, or manually by system users or administrators. The data records may include data associated with entities and organizations. Some examples of such data include customer profiles, transaction details, product data, or any other records containing relevant attributes such as name, address, identifiers, date of birth, phone number, email address, and the like that define an entity in one or more contexts. The data collected at 202 may be stored as pairs of data records. These pairs may relate to individuals, machines, devices, or other entities. The data records may represent various real-world entities, such as a person (e.g., customer data, employee profiles), a machine (e.g., machine sensor data, device performance metrics), or other interconnected entities (e.g., devices communicating within an IoT network). The data management system 132 may process the data records in "pairs" of records where the data may relate to one or more records that need to be compared or evaluated against each other. For instance, a pair may involve two records representing the same customer from different systems (e.g., one from a sales database and another from a shipping database) or two machines whose sensor data needs to be compared to identify similarities or anomalies.

At 204, an attribute pair score generation operation is performed. In the attribute pair score generation operation, the collected data may be taken in pairs and each pair may be processed to generate various scores. For example, the data management system 132 compares the data stored in each attribute of a data record of a pair with the data stored in a corresponding attribute in another data record of the data record pair. For instance, for two customer data records, the data management system 132 may compare their names, addresses, phone numbers, or email addresses to assess whether they refer to the same person. The attribute pair score represents how closely two attributes or sets of attributes match, indicating the likelihood that they belong to the same entity. In cases where records are for the same individual or object (e.g., two records representing the same customer), the attribute pair score may be higher than a threshold (e.g., attribute score above 85%), whereas records for different individuals may result in a score lower than the threshold. For example, if one record lists a customer's address as "123 Main Street" and another as "123 Main St.", the data management system 132 may calculate a high attribute pair score for those records, suggesting a match despite the slight difference in the address. In contrast, the customer's address as "789 main st" records with different addresses may yield a lower score when compared with "123 Main Street" address, suggesting that the records are unlikely to refer to the same person as there is a difference in number like "789".

As additional example, if two data records correspond to customers of a business, the name of the customer in each data record may be considered an attribute. To generate the attribute pair score, the data management system 132 may utilize any suitable matching approach such that the extent of similarity for the attribute in consideration is quantified as a score. For example, a probabilistic comparison of the data in each field of the attribute in a first data record and a second data record may be performed and the degree of match in each field may be consolidated to compute the attribute pair score for the attribute in consideration. Similarly, the attribute pair score may be generated for the remaining attributes present in the data records in a pair of data records. It may be contemplated that the data management system 132 may perform the attribute pair score generation operation for attributes that are common as well as for attributes that are distinct between the data records in the pair of data records.

At 206, a data quality metric selection operation is performed. Data quality of the data records may be expressed in terms of various quality metrics (also referred to as data dimensions or simply dimensions). These metrics may be defined in the context of the information stored in the data records. In various embodiments, the data quality metrics may be predefined by an administrator or by an entity. In various embodiments, the data quality metrics may be dynamically defined in the context of the information stored in the data records under consideration. Irrespective of how these metrics are defined, each data quality metric measures the quality of a data record in some context. Some non-limiting examples of data quality metrics may include accuracy, completeness, consistency, relevancy, freshness, validity, uniqueness, verifiability, auditability, and the like. The completeness dimension may refer to a measure of how complete the data fields of an attribute of a data record are. For example, in a customer record, all required (or relevant) fields like name, address, email, and phone number may be populated for the record to be considered complete. The accuracy dimension may measure whether the values in the data record are correct, such as verifying a customer's email address or phone number against a trusted source. The validity dimension may refer to whether the data falls within expected ranges or conforms to predefined formats, such as ensuring a date field has a valid date format. The freshness dimension is a data quality metric that may measure the recency or age of the information in the data record. This freshness data metric assesses whether the data is up-to-date or whether it has become outdated over time. The uniqueness dimension may measure whether the data in the record represents a distinct entity with no duplicates present. It may be contemplated that the score for each dimension may be computed relative to a respective threshold value or range. Such threshold values and ranges may be user-defined or randomly defined.

In the data quality metric selection operation, the data management system 132 selects the data quality metrics in terms of which the data quality of the records is to be evaluated. In various embodiments, the data management system 132 may receive a selection of such data quality metrics in terms of which the data quality of the records is to be evaluated. Such a selection may be performed randomly by the data management system 132 or a user input may be provided in this regard through a suitable interface. The choice of a data quality metric and the number of such data quality metrics taken into consideration govern the matching criteria for the pair of data records. A large number of data quality metrics may yield a lower number of qualifying matches while a low count of the data quality metrics may yield a large number of qualifying matches.

At 208 a data quality metric score generation operation is performed. In the data quality metric score generation operation, the data management system 132 scores each data record in a pair of data records corresponding to each selected data quality metric. In this regard, a data quality metric may be defined for at least one attribute of a data record. Additionally, or alternately, in various embodiments, a data quality metric may be defined for at least one data field of an attribute of a data record. In order to score the attributes of a data record in terms of a data quality metric, there may be predefined rules that may be utilized for the underlying score computation. For example, a data record pertaining to a customer's name may be provided a score of 10 on 10 for the data quality metric "completeness" if each field of the customer's name has a corresponding entry. Similarly, when only the first name field has an entry, the attribute-"customer's name" may be given a score of 3 out of 10. In this manner, each attribute of each data record in the pair of data records may be scored. As an additional example, a customer's contact information may be given a freshness score of 0.77, indicating that the information was last updated 77% of the way through the designated freshness period (e.g., a year or a quarter).

At 210, a dimension match score generation operation is performed. In the dimension match score generation operation, the data management system 132 generates a consolidated score corresponding to each data quality metric (or dimension) for the pair of data records. For example, corresponding to a data dimension, the individual data quality metric score of each data record in a pair of data records may be obtained and an average of them may be computed as the dimension match score of the pair of data records for the selected data quality metric/dimension. For example, if the freshness of the first record has a score of 0.77, and the freshness of the second record is 0.88, the data management system 132 may compute the dimension match score by averaging these values (0.77+0.88)/2=0.825, which may represent the overall alignment or match of these dimensions across the records.

In various embodiments, to compute the dimension match score of the pair of data records corresponding to a dimension, the data management system 132 may utilize any suitable data stewardship strategy such as minimized, balanced, average, minimum, or maximum. An example of computing the dimension match score corresponding to the dimension/data quality metric of "Accuracy" for a pair of data records is illustrated below for a few data stewardship strategies:

Minimized Data Stewardship (accounting for the probability of two independent events with varying probabilities):

$$Pair\_Accuracy_{minimized}(r_1, r_2) = \text{Accuracy }(r_1) * \text{Accuracy }(r_2)$$

Balanced Data Stewardship (accounting for a softer version of Minimized Data Stewardship to avoid excessive false negatives):

$$Pair\_Accuracy_{balanced}(r_1, r_2) = \sqrt{\text{Accuracy }(r_1) * \text{Accuracy }(r_2)}$$

Average of Data Qualities:

$$Pair\_Accuracy_{averaged}(r_1, r_2) = \text{Average }(\text{Accuracy }(r_1), \text{Accuracy }(r_2))$$

Minimum of Data Qualities:

$$Pair\_Accuracy_{minimum}(r_1, r_2) = \text{Minimum }(\text{Accuracy }(r_1), \text{Accuracy }(r_2))$$

Maximum of Data Qualities:

$$Pair\_Accuracy_{maximum}(r_1, r_2) = \text{Maximum }(\text{Accuracy }(r_1), \text{Accuracy }(r_2)).$$

where:

Accuracy ($r_1$) is the data quality metric score corresponding to the data quality metric "Accuracy" for a first record ($r_1$) in the pair of data records ($r_1$, $r_2$), Accuracy ($r_2$) is the data quality metric score corresponding to the data quality metric "Accuracy" for a second record ($r_2$) in the pair of data records ($r_1$, $r_2$), and Pair_Accuracy ($r_1$, $r_2$) is the dimension match score for the dimension/data quality metric "Accuracy" for the pair of data records ($r_1$, $r_2$).

At 212, a pair feature vector creation operation is performed. In the pair feature vector creation operation, the data management system 132 combines the individual attribute pair scores and dimension match scores to form a pair feature vector. This pair feature vector is a comprehensive representation of similarities between the data records of a pair, incorporating their quality, freshness, and alignment with each other. For example, considering that the attribute pair score of attributes such as name, address, date of birth, and email address between two data records is 9, 40, 15, 15 and dimension match score of data quality metrics-freshness, accuracy, and completeness are 0.77, 0.88, 0.99, respectively, the pair feature vector may be created as a set of these scores in a predefined order: {9, 40, 15, 15, 0.77, 0.88, 0.99}.

At 214, a match outcome information generation operation is performed. In the match outcome information generation operation, the data management system 132 submits the pair feature vector to the trained machine learning model. The trained ML model predicts match outcome information for the pair of data records. The match outcome information may indicate an extent of match between the pair of data records. In this regard, the match outcome information may be a measure of the absolute match between the data records in the pair of data records. The scores defining the pair feature vector may be analyzed (for example compared with a respective threshold) to declare the pair of data records as matching or not matching. In various embodiments, the match outcome information may include information indicating a match or no match between the data records of the pair of data records and a measure of the match or no match between the data records of the pair of data records.

At 216, a data record manipulation operation is performed. In the data record manipulation operation, the data management system 132 evaluates whether the data records of the pair of data records can be linked (e.g., treated as related to each other), merged (e.g., combined into one consolidated record), or skipped, based on the match outcome information generated at 214. The decision-making process involves comparing the information indicating a match or no match between the records and the measure of the match or no match of the match outcome information with predefined or dynamically defined threshold values. These thresholds serve as boundaries for similarity, such as a score above 0.8 for a match may indicate a high likelihood of the records being related and therefore be linked. If the score falls below the threshold, the data management system 132 may flag the records for review or treat them as separate entities. These thresholds may be adjusted dynamically, based on the requirements, or through feedback loops from previous matching processes.

Where two data records of the pair of data records are to be linked or merged, the data management system 132 performs the data record manipulation operation to link/merge the records in the pair of data records. For example, where the data records of the pair of data records are identified as referring to the same entity (such as a person or a device) the data management system 132 performs a merger operation. This involves combining all the relevant and non-redundant data from both records into a single unified entry. For instance, if two customer records from different sources contain the same person's name along with uncommon attributes, the data management system 132 may link or merge them into a single customer profile based on the comparison between the match outcome information, consolidating the latest and most accurate information. Additionally, after merging the two records as one customer profile, the data management system 132 may delete the redundant record. In cases where discrepancies or complex conflicts arise such as a complete mismatch in key attributes like name, address, or other identifiers, the data management system 132 may flag these records for further manual review. This operation ensures that human intervention may be applied to resolve the issue and determine the appropriate action.

At 218, the data management system 132 performs a manipulated data output operation in which the result of the data record manipulation operation at 216 may be output as manipulated data. The output of the manipulated data may include storing the manipulated data in a suitable storage and/or rendering the output on a device. This output includes the final, processed records, which may include linked, merged, or corrected data, depending on the earlier match outcome information and data manipulation decisions. The output data is in a refined state, ready for further processing, reporting, or analysis. For example, manipulated data may be used for customer analysis, providing organizations with a comprehensive view of their customer base, including accurate and updated customer details. It may also be utilized for generating performance reports, offering insights into the quality and reliability of data within the data management system 132. Additionally, the output data may be fed into other systems, such as a Customer Relationship Management (CRM) platform, enabling businesses to leverage the cleansed and consolidated data.

Figure 3:
FIG. 3 is a diagram that illustrates a workflow for evaluating data records and using machine learning to perform data manipulation, in accordance with an embodiment of the disclosure.
Figure 3:
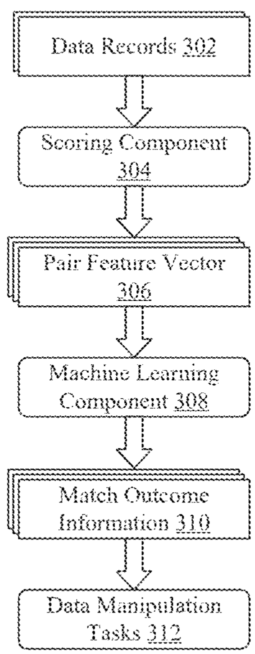

FIG. 3 depicts a workflow 300 for evaluating data records and using machine learning to perform data manipulation, in accordance with an embodiment of the disclosure. FIG. 3 is described in conjunction with elements from FIG. 1A, FIG. 1B, FIG. 1C, FIG. 1D and FIG. 2. In the illustrated embodiment, data records 302 are provided to a scoring component 304. In various embodiments, the data records 302 may generally include any data from any number of sources. For example, the data records 302 may include data for a variety of individual users and/or customers and stored in a variety of data sources. Continuing with this example, a first database may store indications of items purchased by each user, while a second database may store contact information for users. In various embodiments, a single user may have any number of corresponding data records 302, provided by any number of sources. However, there is no easy way to link or match these records. For example, if each data record is complete (with no missing values) and entirely accurate, it may be possible to link the data records 302 with exactly matching attributes (e.g., identical names, addresses, identifiers, phone numbers, and so on). However, in realistic data sets, many of the data records 302 may be incomplete (e.g., with a value for name and address, but no phone number or identifier). This yields uncertainty when matching records. Further, inaccuracies in a record may be caused by a variety of common factors, including mistyping, errors in optical character recognition (ORC) and/or speech recognition, lack of attention by the operator entering the data, and the like. These inaccuracies may further complicate the matching process.

Each data record of the data records 302 may include one or more entries for any number of attributes. For example, for a "name" attribute, the corresponding entry provided in the data records 302 may be "John Doe". In an embodiment, each data record of the data records 302 may or may not provide an entry for any given attribute. Additionally, the particular formatting used for a given attribute may differ across the data records 302, particularly if the data records 302 were collected from different sources. For example, a first data record of the data records 302 may define a field as "date of birth," while a second data record of the data records 302 may have it labeled as "birthday" and still a third data record of the data records 302 may have it labeled as "DOB." Similarly, in formatting the value for the date of birth attribute, one data record may use a month/day/year format (e.g., mm/dd/yyyy), while another data record may use day/month/year (dd/mm/yyyy), and still another data record may use prose text (e.g., Jan. 6, 1980).

The scoring component 304 evaluates the data records 302 to generate a pair feature vector 306 for each pair of data records of the data records 302. Each pair feature vector 306 is a feature vector indicating the extent of similarity between a given pair of data records of the data records 302 in one or more contexts. In various embodiments, the pair feature vector 306 includes numerical values defining data quality for a variety of dimensions across any number of attributes. For example, for a "name" attribute, the corresponding section of the pair feature vector may indicate whether the corresponding data records are an exact match (e.g., using a Boolean value of zero or one) and/are within a predefined edit distance, as well as a value indicating the edit distance between them. Pair feature vectors 306 are described in more detail with reference to FIG. 7.

In various embodiments, the scoring component 304 generates one or more comparison scores for each pair of data records of the data records 302. For example, the scoring component 304 may use one or more default configurations to score and weigh various attributes in each data record of a pair of data records, in order to generate the pair feature vector. Such scores are used to determine whether the records in a pair match (e.g., by comparing the scores to one or more thresholds). In various embodiments, this score is included as a part of the pair feature vector 306 for the record pair. As illustrated, the pair feature vector 306 is provided to a machine learning (ML) component 308, which evaluates them to generate match outcome information 310 for each pair of data records of the data records 302. The match outcome information 310 indicates whether the corresponding records are matched and therefore be linked, connected, or otherwise aggregated together. For example, if two data records of the data records 302 include information relating to the same individual, in various embodiments, the two data records are matched and linked/combined. This provides a more complex and complete set of information for the individual.

In various embodiments, the ML component 308 determines the match outcome information 310 by processing the pair feature vector using one or more trained ML models in the manner described with respect to FIG. 2. A suitable computer system such as the data management system 132 may execute a data manipulation task 312 on at least one data record of a candidate pair of data records.

For example, consider that the workflow 300 is implemented for a candidate pair of a first data record and a second data record. If the match outcome information 310 for such a pair indicates that the first data record and second data record have substantial similarity, one of the first data record or the second data record may be retained in the storage space while the other record of the first data record or the second data record may be deleted.

However, if the match outcome information 310 indicates that the first data record and second data record have some but not substantial similarity, the first data record and the second data record may be linked together using suitable data fields or other measures. For example, both the first data record and the second data record may be assigned a common identifier that indicates they are linked to each other. Alternately or additionally, if the match outcome information indicates that the first data record and second data record have some but not substantial similarity, in various embodiments, the first data record and the second data record may be merged. For example, the first data record may be merged into the second data record by concatenating the uncommon attributes of the first data record with the attributes of the second data record, thereby creating a merged data record. In such a case, the first data record is deleted from the corresponding storage space while the merged data record replaces the second data record in the corresponding storage space.

However, if the match outcome information indicates that the first data record and second data record do not have any similarity (e.g., no match), the two data records are retained as unlinked in the data repository. The data manipulation task 312 in such cases includes a skip operation which leads to storage of the first data record and the second data record in suitable storages without any linkage established between them.

Other manipulation operations that may be defined on a case-to-case basis may also be possible within the scope of this disclosure. It may be contemplated that ascertaining the extent of the match and selecting the suitable manipulation operation may be performed relative to threshold values that may be defined by the user.

Figure 4A:
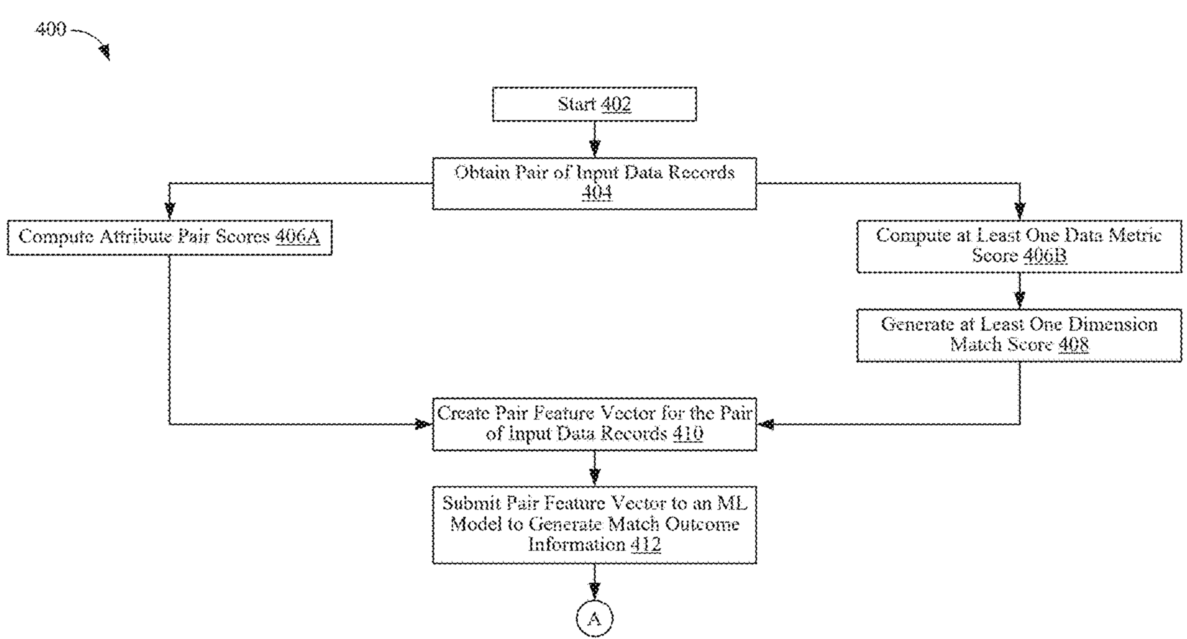
FIGS. 4A and 4B are diagrams that collectively illustrate a flowchart for data quality metric-based manipulation of data records, in accordance with an embodiment of the disclosure.
Figure 4B:
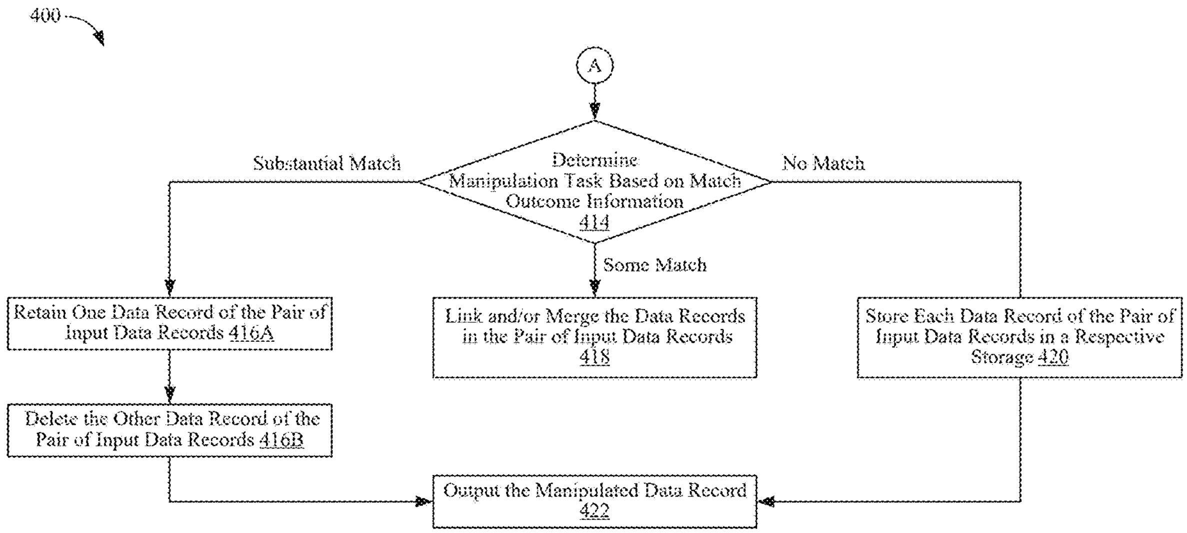

FIGS. 4A and 4B are diagrams that collectively illustrate a flowchart for data quality metric-based manipulation of data records, in accordance with an embodiment of the disclosure. FIGS. 4A and 4B are described in conjunction with FIGS. 1A, FIG. 1B, FIG. 1C, FIG. 1D, FIG. 2, and FIG. 3. With reference to FIGS. 4A and 4B, there is shown a block diagram of a process 400 that illustrates exemplary operations from 402-422, as described herein. The exemplary operations illustrated in the block diagram of the process 400 may start at 402 and may be performed by any computing system, apparatus, or device, such as by the computer 102 of FIG. 1A or the data management system 132 of FIG. 1B. Hereinafter, for the purpose of explanation, the computing device that performs the exemplary operations of the process 400 may be considered to be the data management system 132 of FIG. 1B. Although illustrated with discrete blocks, the exemplary operations associated with one or more blocks of the block diagram of the process 400 may be divided into additional blocks, combined into fewer blocks, or eliminated, depending on the particular implementation. Referring to FIG. 4A, the process 400 commences at 402, either manually or automatically. For example, the process 400 may be invoked on demand by an operator or other computer program when analysis of data records is desired. Alternately, the process 400 may be invoked whenever a new data record arrives for storage in a database. The process 400 includes at operation 404, obtaining a pair of input data records for potential matching or manipulation. The pair of input data records may represent different entries of data that may refer to the same entity (such as two records referring to the same person or device). Each data record of the pair of input data records includes at least one corresponding attribute.

The process 400 includes, at operation 406A, computing at least one attribute pair score corresponding to each attribute of the at least one corresponding attribute of each data record of the pair of input data records. The attribute pair score may be computed in a manner described previously with respect to block 204 of FIG. 2. For example, the data management system 132 may compare attributes such as name, address, or other key identifiers between two records to determine if the attributes refer to the same person or device and generate attribute scores. The results of this comparison help the data management system 132 understand how closely the data of two records align with each other.

The process 400 also includes, at operation 406B, computing at least one data metric score for each data record of the pair of input data records. The at least one data quality score corresponds to at least one data quality metric defined for an attribute of each record of the pair of input data records. The data management system 132 computes the data metric score in a manner described previously with respect to operations 206 and 208 of FIG. 2. Thus, for the pair of input data records, at least two data quality metric scores (one for each data record in the pair of input data records) are computed.

The process 400 also includes, at operation 408, generating at least one dimension match score based on the at least one data quality metric score of each data record of the pair of input data records. The dimension match score provides an evaluation of how well a data dimensions (data quality metric) from both records align with each other. This may be based on various techniques, such as averaging, multiplication, or other aggregation methods, depending on the desired application and accuracy. The dimension match score may be computed in a manner described previously with respect to operation 210 of FIG. 2.

The process 400 also includes, at operation 410, creating a pair feature vector for the pair of input data records. The pair feature vector is a comprehensive representation of the comparison between the two records expressed in terms of the attribute pair score(s) and the dimension match score(s). The pair feature vector may be created in a manner described previously with respect to operation 212 of FIG. 2.

The process 400 also includes, at operation 412, submitting the pair feature vector to an ML model to generate match outcome information. The trained ML model predicts match outcome information for the pair of data records. The match outcome information may indicate an extent of match between the pair of data records. In this regard, the match outcome information may be a measure of the absolute match between the data records in the pair of data records. The match outcome information may be generated in a manner described previously with respect to operation 214 of FIG. 2.

The process 400 also includes, at operation 414, determining a manipulation task for the pair of input data records, based on the match outcome information. In this regard, the match outcome information may be analyzed to decipher the extent of absolute match between the pair of input data records. In this regard, the data management system 132 analyses the generated match outcome information in relation to at least one threshold range to determine the extent of the match.

For example, if the match outcome information indicates that input data records in the pair have a strong similarity (e.g., substantial match), the data management system 132 may determine the manipulation task at the operation 414 as a deduplication task. In such a case, the control of operations may pass to retaining one data record of the pair of input data records at operation 416A and thereafter deleting the other data record of the pair of input data records at operation 416B.

However, if the match outcome information indicates that input data records in the pair have some but not substantial similarity (e.g. some match), the data management system 132 may determine the manipulation task at the operation 414 as a linking and/or merger task. In such a case, the control of operations may pass to linking and/or merging the data records in the pair of input data records at operation 418. For example, both a first data record and a second data record of the pair of input data records may be assigned a common identifier indicating that they are linked to each other. Alternately or additionally, if the match outcome information indicates that the first data record and second data record have some but not substantial similarity, in various embodiments, the first data record and the second data record may be merged. For example, the first data record may be merged into the second data record by concatenating the uncommon attributes of the first data record with the attributes of the second data record, thereby creating a merged data record. In such a case, the first data record is deleted from the corresponding storage space while the merged data record replaces the second data record in the corresponding storage space.

However, if the match outcome information indicates that input data records in the pair have no similarity (e.g., no match), the data management system 132 may determine the manipulation task at the operation 414 as a store and skip task. In such a case, the control of operations may pass to storing each data record of the pair of input data records in a respective storage at operation 420. The two data records in the pair of input data records are retained as unlinked in the data repository. The manipulation operation in such cases includes a skip operation which leads to storage of the first data record and the second data record in suitable storages without any linkage established between them.

In this way, manipulation of the pair of input data records is executed as per the match outcome information, and the process 400 further includes at operation 422, outputting the manipulated data record. The outputting of manipulated data may include storing the manipulated data in a suitable storage and/or rendering the output on a device.

Figure 5:
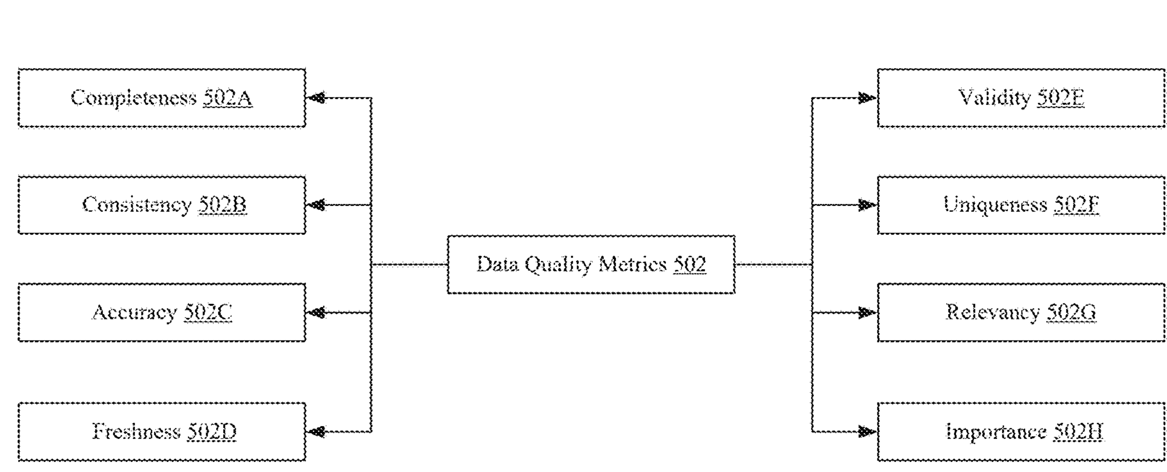
FIG. 5 is a diagram that illustrates data quality metrics for manipulating data in data management, in accordance with an embodiment of the disclosure.

FIG. 5 is a diagram that illustrates some exemplar data quality metrics utilized for manipulating data in MDM, in accordance with an embodiment of the disclosure. FIG. 5 is described in conjunction with FIGS. 1A, FIG. 1B, FIG. 1C, FIG. 1D, FIG. 2, FIG. 3, FIG. 4A, and FIG. 4B. The data management system 132 evaluates the quality of input data through the calculation of various data quality metrics 502, which may include a completeness 502A metric, a consistency 502B metric, an accuracy 502C metric, a freshness 502D metric, a validity 502E metric, a uniqueness 502F metric, a relevancy 502G metric, and an importance 502H metric. The data management system 132 utilizes the metrics 502A-502H to assess the reliability and usability of data in the manner described previously in reference to FIGS. 1A-4B. This helps to ensure that only high-quality data is used for processing, analysis, and/or decision-making by downstream applications that consume such data.

The completeness 502A metric is a measure of whether all relevant fields in a data record are populated. The data management system 132 computes a completeness score for a data record by evaluating the presence or absence of required attributes within the data record. If any data fields are missing, the completeness score may be lower than a completeness threshold to reflect the lack of relevant data. For example, a first data record may have a missing address field, but a second data record may be complete with all fields populated. The completeness score for the first data record may be lower than that of the second data record.

The consistency 502B metric is a measure of whether the data is uniform and coherent, at least within individual records across the entire dataset, or both. The data management system 132 computes a consistency score for a data record by evaluating the data fields of the data record in relation to a reference data record. Such a reference data record may be predefined or randomly chosen from among a plurality of data records that are under evaluation. For example, a data record may store the date of birth of a person according to two different ID documents. If the stored date of birth as per each ID document is the same in terms of date, month, and year, the consistency score for that record may be higher than a consistency threshold. However, for another data record, if the date of birth as per each ID of the IDs is different or conflicting, the consistency score may be lower than the consistency threshold. In an additional example, a data record may be considered to have two attributes-a date of birth attribute and a year of passing high school attribute. If the entry in the year data field in the date of birth attribute is lower than the entry in the year data field in the year of passing high school attribute, the data management system 132 assigns a maximum consistency score to the data record indicating high consistency of the data record in relation to a threshold consistency level. However, if the entry in the year data field in the date of birth attribute is higher than the entry in the year data field in the year of passing high school attribute, the data management system 132 assigns a minimum consistency score to the data record indicating inconsistency in the data record in relation to a threshold consistency level. In various embodiments, the difference between the entry in the year data field in the year of passing high school attribute and the entry in the year data field in the date of birth attribute may be compared with a threshold range (indicating the usual age range of passing high school). If the difference is within the threshold range, the consistency score may be maximum. If the difference is negative or zero, the consistency score may be minimal. If the difference is non-negative but outside the threshold range, the data management system 132 computes the consistency score using a distance function that quantifies the gap between the difference and the upper or lower limit of the threshold range into a numerical score. In such a case, the consistency score may be an intermediate value between the maximum and the minimum value allowed for the consistency score.

The accuracy 502C metric measures how closely the data matches known, reliable sources or real-world facts. To compute the accuracy score, the data management system 132 compares each data field in a data record with validated sources or validated formats of that data field. For example, for a data record containing an account number, the data management system 132 compares the account number in the data record with a validated source of the account number to determine if it is accurate or not. Based on the extent of overlap between the account number in the data record and that in the validated source, the data management system 132 assigns the accuracy score to the data record.

The freshness 502D metric evaluates how recent the data is in the context of the specific task or system in question. Such a metric is useful in applications that rely on real-time or near-real-time data, where outdated information may lead to erroneous conclusions or decisions. To compute the freshness score, the data management system 132 compares the timestamp or the most recent update time associated with each data record under consideration. In this regard, the data management system 132 utilizes a reference or cutoff timestamp to compute the freshness score for a data record. For example, if record 1 reflects a more recent transaction (such as a deposit or withdrawal) with respect to a reference timestamp and record 2 is an older version of the same record with respect to the reference timestamp, the data management system 132 may assign record 1 a higher freshness score than record 2. In various embodiments, the reference timestamp may be predefined or selected as a current timestamp at run time.

The validity 502E metric ensures that the data adheres to predefined formats or rules. For instance, in an address database, validity checks may ensure that the postal code follows the proper format for a specific country or region, such as five digits for a U.S. ZIP code. Similarly, in a contact list, email addresses must conform to a valid format, such as "name@domain.com." If a phone number contains alphabetic characters or an email address lacks the "@" symbol, these inconsistencies may lead to a reduced validity score. Invalid entries may receive a very low validity score, highlighting the need for validation to meet predefined rules. To compute the validity score of a data record, the data management system 132 compares the entry in each data field of the data record with a permissible entry. In this regard, the data management system 132 may reference a plurality of rules defined in a rule database that govern the validity check for data fields in a data record. For each impermissible entry, the data management system 132 may deduct a penalty value from the total value allowed for the validity score. After checking all data fields in a data record and making the required penalty deductions, the data management system 132 deems the final score as the validity score for that data record.

The uniqueness 502F metric evaluates whether data records in a dataset are distinct or if duplicates exist. This helps in preventing redundancy and ensuring data quality. When comparing the pairs of input data records, the data management system 132 generates a uniqueness score to assess how likely it is that two records belong to the same entity. The data management system 132 calculates the uniqueness score by examining the attributes in each data record, such as account number, name, address, and contact details. For example, if two records for the same individual show slight differences in name spelling or address formatting, the uniqueness score may quantify the degree of match. If the records appear to refer to the same entity, the score may be high, signaling potential duplication, which may prompt merging or flagging for further review. Conversely, if the records refer to different individuals, the uniqueness score may reflect a low match, confirming that they belong to separate entries.

The relevancy 502G metric evaluates how closely a given data record aligns with the specific criteria required for the task or context. For example, in a marketing campaign, the data management system 132 may assign a relevancy score higher than a relevancy threshold for customers whose recent purchase behavior matches the target demographic, such as age group, location, or product preferences. Data records of customers who fit the profile of the target audience—those who have interacted with the brand recently and whose buying patterns align with the current campaign—may receive a higher relevancy score. On the other hand, data records that fall outside the campaign's target parameters, such as those of customers who have not interacted with the brand in a significant period, may receive a lower relevancy score.

The importance 502H metric evaluates the weight or priority of the data based on its potential impact on decision-making or operations within the data management system 132 or a downstream application. In various embodiments, the data management system 132 may assign the importance score for the data records or attributes of the data records based on a contextual analysis of the data record to determine its impact on a matching decision. The importance score helps prioritize which data should be given more focus due to its significance in achieving key objectives or critical operational processes.

The metrics are not limited to those listed above but may be expanded to include others as needed, based on specific requirements, or use cases such as timeliness, trustworthiness, availability, or usability. For instance, timeliness may evaluate whether data is available when needed for decision-making processes, and trustworthiness may measure the credibility of the data record. The data quality metric scores may be calculated as a percentage, fraction, or decimal number.

FIG. 6 depicts an example workflow 600 to generate a pair feature vector in order to evaluate data records using matching configurations and machine learning, in accordance with an embodiment of the disclosure. FIG. 6 is described in conjunction with FIG. 1A, FIG. 1B, FIG. 1C, FIG. 1D, FIG. 2, FIG. 3, FIG. 4A, FIG. 4B, and FIG. 5. FIG. 6 shows a table 622 which includes a column 602 for a plurality of attributes for two data records-a record A whose data entry against each attribute is shown in column 604 and a record B whose data entry against each attribute is shown in column 606 and a column 608 for attribute pair score for the two data records A and B. In the illustrated embodiment, the record A includes various attributes-NAME with corresponding entry of "THOMAS JONES," PHONE NUMBER with corresponding entry of "129-532-871," ADDRESS with corresponding entry of "100 Main St, Toronto," and EMAIL with corresponding entry of "tjones@gail.com,". Further, the records B includes various attributes-NAME with corresponding entry of "THOMAS JONES BR," PHONE NUMBER with corresponding entry of "129-532-871," ADDRESS with corresponding entry of "1 Main St, Toronto," and EMAIL with corresponding entry of "thomasbr@gamil.com,".

Each attribute of the attributes has a corresponding maximum score which is mentioned against the attribute in parenthesis. The attribute pair score corresponding to each attribute is listed against that attribute in the column 608 for ATTRIBUTE PAIR SCORE. For example, the attribute NAME has a maximum score of 10. For the record pair of record A and record B, the attribute pair score is 9 out of 10 because the corresponding entry in each record is almost similar. The scores mentioned under the column 608 in the table 622 are generated based on the comparison between the two records A and B where the total score for the name attribute is 9 out of 10, indicating a high level of similarity in relation to a threshold similarity level despite the minor difference in names. Similarly, the attribute pair score for the PHONE NUMBER attribute is 15 out of 20, for the EMAIL attribute, is 5 out of 10, and for the ADDRESS attribute is 40 out of 50.

Additionally, in the illustrated diagram, a table 624 indicates a plurality of data metrics 610 as well as corresponding data metric scores for the two records—the record A and the record B. These data quality metrics help assess the reliability of each record's information, measuring factors like verifiability and completeness. For instance, the verifiability data metric score for record A is 0.99, indicating that the data is highly verified in relation to a threshold verifiability level, while record B has a score of 0.8, resulting in an average total verifiability data metric score for the pair of record A and record B of 0.7425. Similarly, the completeness data metric score for record A is 0.75, while that for record B is 0.7; the combined total completeness data metric score for the pair of record A and record B is therefore 0.56, representing the average completeness of the two records in relation to a threshold completeness level. The total scores in the table 624, representing values like 0.7425 for verifiability data metric and 0.56 for completeness data metric are the dimension match scores corresponding to the respective dimension or data quality metric, which may be computed using various aggregation methods, depending on the specific requirements of the data management system 132.

Following the calculation of attribute scores and dimension match scores, the values are aggregated to create a pair feature vector 614, forming a detailed representation of the similarity and quality of information between records A and B. The pair feature vector 614, containing values such as 9, 12, 5, 40, 0.7425, and 0.56, encapsulates the results of individual attribute comparisons (like name, phone number, and address) and data quality metrics (such as verifiability and completeness). The pair feature vector 614 thus provides a quantitative summary that reflects both how closely the records resemble each other and the reliability of the data within each record. The pair feature vector 614 is subsequently analyzed by a machine learning (ML) model 616, which is trained to classify records based on patterns observed in large data records. The model assesses the values in the pair feature vector 614 to determine whether they meet the criteria for a "MATCH" or "NO MATCH."

In this case, the outcome is classified as "MATCH" 618, indicating that the data management system 132 considers records A and B to be similar or related. This "MATCH" outcome is based on the similarity scores observed across critical attributes. The machine learning model may likely weigh certain attributes, like PHONE NUMBER or ADDRESS, more heavily than others, as these tend to be strong identifiers in distinguishing records. In this case, the combination of similar attributes and acceptable data quality metrics likely pushes the similarity score above the threshold defined within the model, resulting in a "MATCH." This outcome indicates that despite minor discrepancies, records A and B are sufficiently similar and reliable, supporting the conclusion that they refer to the same entity. As a result, the data management system 132 may proceed to link, merge, or otherwise consolidate the two records.

Figure 7:
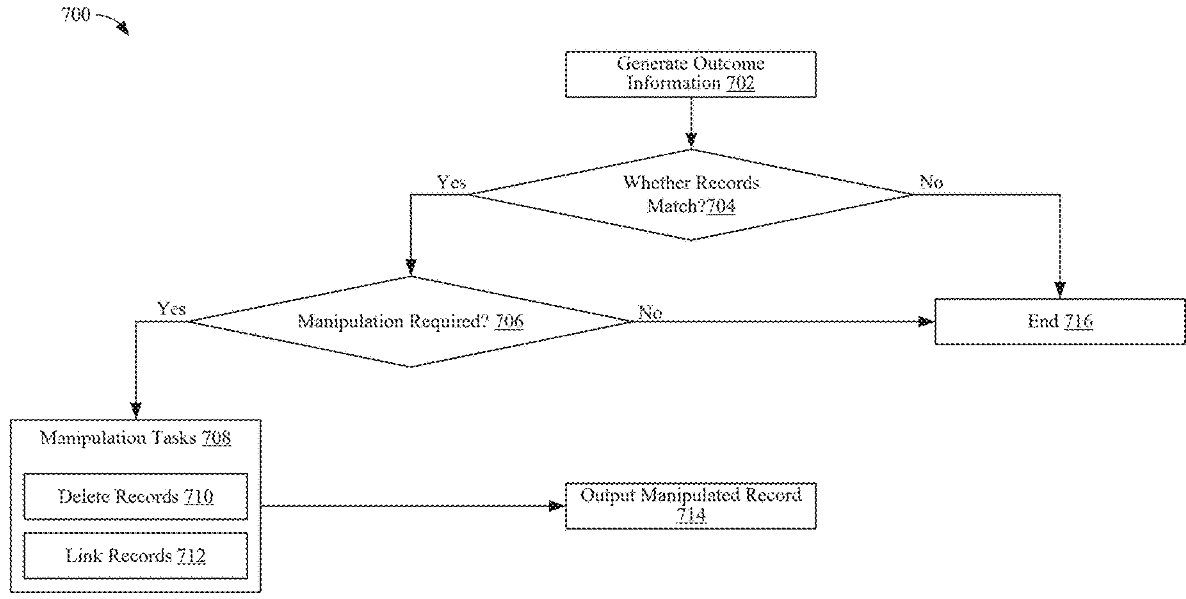
FIG. 7 is a flowchart that illustrates a process for manipulating the records shown in FIG. 6, in accordance with an embodiment of the disclosure.

FIG. 7 is a flowchart that illustrates a process 700 for manipulating the records shown in FIG. 6, in accordance with an embodiment of the disclosure. This flow diagram illustrates how the data records are linked after the outcome information is generated. FIG. 7 is described in conjunction with elements from FIG. 1A, FIG. 1B, FIG. 1C, FIG. 1D, FIG. 2, FIG. 3, FIG. 4A, FIG. 4B, FIG. 5, and FIG. 6. With reference to FIG. 7, there is shown a block diagram of a process 700 that illustrates exemplary operations from 702-716, as described herein. The exemplary operations illustrated in the block diagram of the process 700 may start at 702 and may be performed by any computing system, apparatus, or device, such as by the computer 102 of FIG. 1A or the data management system 132 of FIG. 1B. Hereinafter, for the purpose of explanation, the computing device that performs the exemplary operations of the process 700 may be considered to be the data management system 132 of FIG. 1B. Although illustrated with discrete blocks, the exemplary operations associated with one or more blocks of the block diagram of the process 700 may be divided into additional blocks, combined into fewer blocks, or eliminated, depending on the particular implementation. Referring to FIG. 7, the process 700 includes, at 702, generating outcome information, which encapsulates the result from the machine learning classification model in FIG. 6. Following the generation of outcome information at 702, the data management system 132 evaluates at 704 whether the records match. If the data management system 132 identifies that the records do not meet the similarity threshold, indicating that they represent distinct entities and do not match, no further action is taken, and the process 700 concludes at 716. This outcome may preserve both records as separate entries, ensuring that unrelated or dissimilar data remains distinct in the database.

However, if the records meet the similarity criteria at 704, suggesting that they refer to the same entity, the data management system 132 checks, at 706, if manipulation is required. In cases where no manipulation is required such as when records are already linked or organized to provide a complete view of the entity, the control of operations may proceed to 716 and the process 700 may end without altering the data. This approach is useful when minimal intervention is desired, allowing the data management system 132 to confirm the match without making structural changes to the records. However, if at 706, it is ascertained that manipulation is required, the data management system 132 proceeds to execute manipulation task 708 to handle the matching records.

The manipulation tasks 708 include deleting records (for duplicate records) 710 and/or linking records 712. If the records are determined to be duplicates, one of them may be removed to eliminate redundancy in the database. The deletion of records ensures that only a single, accurate representation of the entity remains, contributing to data clarity and avoiding duplicate entries. When both records contain unique or supplementary information, the data management system 132 links them to create a unified, comprehensive view of the entity across different datasets or systems. This linking process is particularly valuable when each record holds distinct details that, when combined, provide a full understanding of the entity without any need to delete any data. After performing any required manipulation, the process concludes by outputting the data record at 714. The final output, whether in the form of linked or refined records, is then available for further processing, analysis, or integration into other systems.

Figure 8:
FIG. 8 is a diagram that illustrates an exemplary method involving an authentication process for master data management, in accordance with an embodiment of the disclosure.
Figure 8:
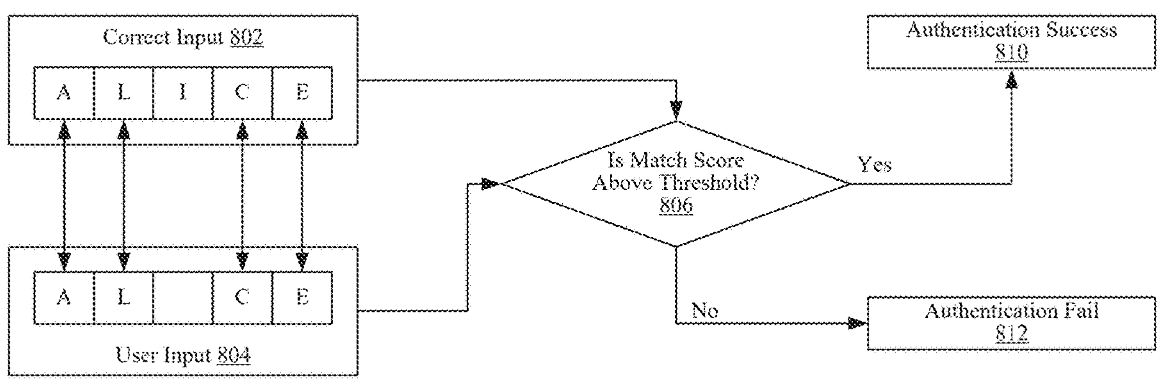

FIG. 8 is a diagram that illustrates an exemplary method involving an authentication process for master data management, in accordance with an embodiment of the disclosure. FIG. 8 is described in conjunction with FIG. 1A, FIG. 1B, FIG. 1C, FIG. 1D, FIG. 2, FIG. 3, FIG. 4A, FIG. 4B, FIG. 5, FIG. 6, and FIG. 7. With reference to FIG. 8, there is shown an environment 800, which includes a correct input 802 block and a user input 804 block, where each letter in the username is treated as a separate field. This design enables the authentication process to evaluate each character individually. FIG. 8 illustrates a scenario where a system is configured to authenticate a user by comparing their entered username (as the user input 804 block) against a correct, stored username (as the correct input 802 block). In this example, consider an enterprise environment where a user must authenticate by entering their username and password. While conventional authentication systems place strict matching requirements between the entered username and the permitted username, and the entered password and the permitted password, various embodiments relax the matching requirements by permitting an acceptable error in the username.

In the example illustrated in FIG. 8, the correct username stored in the cloud is "A LICE," with each letter treated as a separate field in the user input 804 block. The user enters the username in the user input 804 block as "ALCE" where one character "I" is missing as shown in the user input 804 block. This setup allows the system to evaluate the similarity between the two data records corresponding to the correct input 802 block and the user input 804 block at a granular, character-by-character level.

A computing system such as the computer 102 of FIG. 1A or the data management system 132 of FIG. 1B may use a machine learning model to generate an absolute match score for the data records corresponding to the correct input 802 block and the user input 804 block by comparing each corresponding character in the correct input 802 block and the user input 804 block. The computing system may calculate the absolute match score between the data records corresponding to the correct input 802 block and the user input 804 block in a manner described with reference to operations 404-412 of FIG. 4A. The absolute match score indicates an extent of absolute match between the data records corresponding to the correct input 802 block and the user input 804 block. The computing system compares the absolute match score against a threshold value. The threshold value may be set to be a value slightly less than 100 such that it corresponds to permitting one mismatched character in the username. At operation 806, a check is performed regarding whether the match score is above the threshold value. If the result of the check atoperation 806 is a yes, (e.g., the match score between the correct input 802 block and the user input 804 block is above the threshold), the authentication for the username field may be deemed successful at operation 810. However, if the result of the check at operation 806 is a no, (e.g., the match score is less than or equal to the threshold), the authentication for the username field may be deemed fail at operation 812.

Such a setup enables the computing system to tolerate minor errors in the username input, such as a single incorrect or missing character, while still enforcing a standard of similarity sufficient to prevent incorrect matches. By allowing a threshold-based approach, the computing system may accommodate slight input variations without compromising on the accuracy needed for reliable authentication.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining, by a computer, a pair of input data records, wherein each data record of the pair of input data records comprises at least one corresponding attribute;

applying, by the computer, a machine learning (ML) model on the pair of input data records, wherein the ML model is trained to match the pair of input data records at an attribute level based on a pair feature vector that includes at least one attribute pair score and at least one dimension match score of a plurality of dimension match scores for the pair of input data records, each dimension match score of the plurality of dimension match scores corresponds to a different data quality metric of a plurality of data quality metrics, and the at least one attribute pair score quantifies an extent of match between the at least one corresponding attribute of a first data record in the pair of input data records and the at least one corresponding attribute of a second data record in the pair of input data records;

generating, by the computer, match outcome information for the pair of input data records, based on the applying of the ML model on the pair of input data records, wherein the match outcome information indicates an extent of match between the pair of input data records;

merging, by the computer, based on the generated match outcome information, the first data record into the second data record to generate merged data record;

deleting, by the computer, the first data record from a data storage device based on the merging; and storing, by the computer, the merged data record in the data storage device.

2. The computer-implemented method of claim 1, further comprising computing, by the computer, the at least one attribute pair score corresponding to each attribute of the at least one corresponding attribute of each data record of the pair of input data records.

3. The computer-implemented method of claim 1, further comprising computing, by the computer, at least one data quality score for each data record of the pair of input data records, wherein the at least one data quality score corresponds to at least one data quality metric of the plurality of data quality metrics.

4. The computer-implemented method of claim 3, wherein the at least one corresponding attribute of each data record of the pair of input data records comprises at least one data field, and each data quality metric of the plurality of data quality metrics is defined for a respective data field of the at least one data field of each attribute of the at least one corresponding attribute.

5. The computer-implemented method of claim 3, wherein the at least one data quality metric is defined for each attribute of the at least one corresponding attribute of each data record of the pair of input data records.

6. The computer-implemented method of claim 1, wherein the computer-implemented method further comprises:

computing, by the computer, a first data metric score for the first data record, wherein the first data metric score corresponds to a data quality metric of the plurality of data quality metrics;

computing, by the computer, a second data metric score for the second data record, wherein the second data metric score corresponds to the data quality metric; and computing, by the computer, the at least one dimension match score for the pair of input data records, based on the first data metric score and the second data metric score.

7. The computer-implemented method of claim 1, further comprising generating, by the computer, the pair feature vector for the pair of input data records based on the at least one attribute pair score and the at least one dimension match score.

8. A computer system, comprising:

a processor set;

one or more computer-readable storage media; and program instructions stored on the one or more computer-readable storage media, the program instructions executable by the processor set to cause the processor set to:

obtain a pair of input data records, wherein each data record of the pair of input data records comprises at least one corresponding attribute;

apply a machine learning (ML) model on the pair of input data records, wherein the ML model is trained to match the pair of input data records at an attribute level based on a pair feature vector that includes at least one attribute pair score and at least one dimension match score of a plurality of dimension match scores for the pair of input data records, each dimension match score of the plurality of dimension match scores corresponds to a different data quality metric of a plurality of data quality metrics, and the at least one attribute pair score quantifies an extent of match between the at least one corresponding attribute of a first data record in the pair of input data records and the at least one corresponding attribute of a second data record in the pair of input data records;

generate match outcome information for the pair of input data records, based on the application of the ML model on the pair of input data records, wherein the match outcome information indicates an extent of match between the pair of input data records;

merge, based on the generated match outcome information, the first data record into the second data record to generate merged data record;

delete the first data record from a data storage device based on the merger; and store the merged data record in the data storage device.

9. The computer system of claim 8, wherein the program instructions further cause the processor set to compute the at least one attribute pair score corresponding to each attribute of the at least one corresponding attribute of each data record of the pair of input data records.

10. The computer system of claim 8, wherein the program instructions further cause the processor set to compute at least one data quality score for each data record of the pair of input data records, and wherein the at least one data quality score corresponds to at least one data quality metric of the plurality of data quality metrics.

11. The computer system of claim 10, wherein the at least one corresponding attribute of each data record of the pair of input data records comprises at least one data field, and each data quality metric of the plurality of data quality metrics is defined for a respective data field of the at least one data field of each attribute of the at least one corresponding attribute.

12. The computer system of claim 10, wherein the at least one data quality metric is defined for each attribute of the at least one corresponding attribute of each data record of the pair of input data records.

13. The computer system of claim 8, wherein the program instructions further cause the processor set to:

compute a first data metric score for the first data record, wherein the first data metric score corresponds to a data quality metric of the plurality of data quality metrics;

compute a second data metric score for the second data record, wherein the second data metric score corresponds to the data quality metric; and compute the at least one dimension match score for the pair of input data records, based on the first data metric score and the second data metric score.

14. The computer system of claim 8, wherein the program instructions further cause the processor set to generate the pair feature vector for the pair of input data records based on the at least one attribute pair score and the at least one dimension match score.

15. A computer-program product for data record manipulation, the computer-program product comprising:

one or more computer-readable storage media; and program instructions stored on the one or more computer-readable storage media to perform operations comprising:

obtaining a pair of input data records, wherein each data record of the pair of input data records comprises at least one corresponding attribute;

applying a machine learning (ML) model on the pair of input data records, wherein the ML model is trained to match the pair of input data records at an attribute level based on a pair feature vector that includes at least one attribute pair score and at least one dimension match score of a plurality of dimension match scores for the pair of input data records, each dimension match of the plurality of dimension match scores corresponds to a different data quality metric of a plurality of data quality metrics, and the at least one attribute pair score quantifies an extent of match between the at least one corresponding attribute of a first data record in the pair of input data records and the at least one corresponding attribute of a second data record in the pair of input data records;

generating match outcome information for the pair of input data records, based on the applying of the ML model on the pair of input data records, wherein the match outcome information indicates an extent of match between the pair of input data records;

merging, based on the generated match outcome information, the first data record into the second data record to generate merged data record;

deleting the first data record from a data storage device based on the merging; and storing the merged data record in the data storage device.

* * * * *